US012258730B2

(12) United States Patent
Sano et al.

(10) Patent No.: US 12,258,730 B2
(45) Date of Patent: Mar. 25, 2025

(54) SHOVEL, AND MANAGEMENT APPARATUS AND ASSIST DEVICE FOR SHOVEL

(71) Applicant: SUMITOMO HEAVY INDUSTRIES, LTD., Tokyo (JP)

(72) Inventors: Yusuke Sano, Kanagawa (JP); Chunnan Wu, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 18/482,383

(22) Filed: Oct. 6, 2023

(65) Prior Publication Data

US 2024/0044107 A1 Feb. 8, 2024

Related U.S. Application Data

(63) Continuation of application No. 16/575,860, filed on Sep. 19, 2019, now Pat. No. 11,788,253, which is a
(Continued)

(30) Foreign Application Priority Data

Mar. 22, 2017 (JP) .................................. 2017-056004
Mar. 27, 2017 (JP) .................................. 2017-061956

(51) Int. Cl.
*E02F 9/22* (2006.01)
*E02F 3/43* (2006.01)
(Continued)

(52) U.S. Cl.
CPC ............ *E02F 9/2029* (2013.01); *E02F 3/437* (2013.01); *E02F 9/2045* (2013.01); *E02F 9/261* (2013.01); *E02F 9/265* (2013.01); *G01G 19/083* (2013.01)

(58) Field of Classification Search
CPC ....... E02F 9/2029; E02F 3/437; E02F 9/2045; E02F 9/261; E02F 9/265; E02F 9/2033;
(Continued)

(56) References Cited

U.S. PATENT DOCUMENTS 78,999 A 6/1868 Post
1,237,878 A 8/1917 Downie
(Continued)

FOREIGN PATENT DOCUMENTS

EP 0334959 10/1989
JP H04-083026 3/1992
(Continued)

OTHER PUBLICATIONS

International Search Report for PCT/JP2018/011395 mailed on Jun. 12, 2018.
(Continued)

*Primary Examiner* — Edwin J Toledo-Duran

(74) *Attorney, Agent, or Firm* — IPUSA, PLLC

(57) ABSTRACT

A shovel includes a lower traveling body, an upper turning body mounted on the lower traveling body, an attachment attached to the upper turning body, and a control device mounted on the upper turning body and configured to assist an excavating motion with the attachment. The control device is configured to derive a target excavation depth based on the hardness of an excavation target.

6 Claims, 15 Drawing Sheets

Related U.S. Application Data continuation of application No. PCT/JP2018/011395, filed on Mar. 22, 2018.

(51) Int. Cl.
- *E02F 9/20* (2006.01)
- *E02F 9/26* (2006.01)
- *G01G 19/08* (2006.01)

(58) Field of Classification Search
CPC . E02F 3/435; E02F 9/264; E02F 9/262; E02F 3/431; E02F 9/2271; E02F 9/26; E02F 3/422; E02F 9/2025; E02F 9/22; G01G 19/083; B60P 3/00; B62D 55/07
See application file for complete search history.

(56) References Cited

U.S. PATENT DOCUMENTS

| | | | |
|---|---|---|---|
| 2,355,519 A | 8/1944 | Dunham | |
| 2,801,512 A | 8/1957 | Karaktin | |
| 2,824,506 A | 2/1958 | Smithburn | |
| 3,469,635 A | 9/1969 | Hartl | |
| 3,713,700 A | 1/1973 | Montacie | |
| 3,838,428 A | 9/1974 | Benson et al. | |
| 3,979,731 A * | 9/1976 | Naplatanov | E21C 41/26 340/993 |
| 4,137,974 A | 2/1979 | Decker | |
| 4,470,635 A | 9/1984 | Paurat et al. | |
| 4,838,357 A | 6/1989 | Adachi et al. | |
| 5,699,247 A | 12/1997 | Moriya et al. | |
| 5,822,224 A | 10/1998 | Nakanishi et al. | |
| 5,836,089 A | 11/1998 | Lipsker | |
| 6,035,249 A | 3/2000 | Yamamoto et al. | |
| 6,164,223 A | 12/2000 | Eriksson | |
| 6,205,687 B1 | 3/2001 | Rocke | |
| 6,701,857 B1 | 3/2004 | Jensen et al. | |
| 7,263,955 B1* | 9/2007 | Fischer | B62D 57/00 123/46 R |
| 7,275,906 B1* | 10/2007 | Pool | B65F 9/00 414/397 |
| 8,528,988 B2* | 9/2013 | Von | E21C 25/68 299/1.5 |
| 9,464,409 B2* | 10/2016 | Magaki | E02F 9/26 |
| 9,752,298 B2 | 9/2017 | Nakamura et al. | |
| 10,147,339 B2* | 12/2018 | Kozumi | G09B 19/24 |
| 11,619,028 B2* | 4/2023 | Izumikawa | E02F 9/262 701/50 |
| 2006/0021769 A1 | 2/2006 | Ankenman et al. | |
| 2006/0026101 A1* | 2/2006 | Ogura | E02F 9/26 705/50 |
| 2006/0212203 A1* | 9/2006 | Furuno | E02F 9/26 701/50 |
| 2006/0287841 A1* | 12/2006 | Hoshi | G01F 9/00 702/182 |
| 2007/0129869 A1 | 6/2007 | Gudat et al. | |
| 2008/0195365 A1* | 8/2008 | Ohkura | E02F 9/26 703/2 |
| 2008/0319710 A1* | 12/2008 | Hsu | G01G 19/083 702/174 |
| 2010/0245542 A1* | 9/2010 | Kim | G01B 11/00 37/444 |
| 2011/0227744 A1* | 9/2011 | Shibata | G07C 5/085 340/679 |
| 2011/0276261 A1* | 11/2011 | Mizutani | B66C 13/18 701/123 |
| 2012/0065874 A1* | 3/2012 | Sato | G07C 5/004 701/123 |
| 2012/0185159 A1* | 7/2012 | Yamauchi | G01F 15/0755 701/123 |
| 2012/0290178 A1 | 11/2012 | Suzuki et al. | |
| 2012/0312599 A1 | 12/2012 | Trinh et al. | |
| 2012/0323495 A1 | 12/2012 | Zhou et al. | |
| 2013/0230212 A1* | 9/2013 | Landes | G06T 7/001 382/104 |
| 2013/0248212 A1 | 9/2013 | Bassett | |
| 2014/0000919 A1 | 1/2014 | Bachman et al. | |
| 2014/0048296 A1 | 2/2014 | Bassett | |
| 2015/0264857 A1 | 9/2015 | Achen et al. | |
| 2016/0238502 A1 | 8/2016 | Wilshire et al. | |
| 2017/0002540 A1 | 1/2017 | Fletcher et al. | |
| 2017/0052518 A1* | 2/2017 | Wang | G05B 19/4183 |
| 2017/0159246 A1 | 6/2017 | Pistrol et al. | |
| 2017/0255895 A1* | 9/2017 | Kozumi | E02F 9/264 |
| 2018/0137446 A1* | 5/2018 | Shike | G06Q 50/08 |
| 2018/0218304 A1* | 8/2018 | Shike | G06Q 10/0631 |
| 2018/0245449 A1* | 8/2018 | Raffuzzi | G01B 5/207 |
| 2019/0216005 A1 | 7/2019 | Bassett | |
| 2020/0299935 A1* | 9/2020 | Izumikawa | E02F 9/2025 |
| 2021/0012163 A1* | 1/2021 | Li | E02F 9/2054 |
| 2021/0295226 A1* | 9/2021 | Walker | G06Q 10/0635 |

FOREIGN PATENT DOCUMENTS

| | | |
|---|---|---|
| JP | H05-065723 | 3/1993 |
| JP | H06-027949 U | 4/1994 |
| JP | H06-089550 | 11/1994 |
| JP | H08-081977 | 3/1996 |
| JP | 2000-136524 | 5/2000 |
| JP | 2000-291076 | 10/2000 |
| JP | 2002-304441 | 10/2002 |
| JP | 2005-344482 | 12/2005 |
| JP | 2011-162273 | 8/2011 |
| JP | 2011-252338 | 12/2011 |
| JP | 2013-161192 | 8/2013 |
| JP | 2013-221309 | 10/2013 |
| JP | 2016-160718 | 9/2016 |
| WO | 96/24031 | 8/1996 |
| WO | 2011/090077 | 7/2011 |
| WO | 2015/181972 | 12/2015 |

OTHER PUBLICATIONS

Partial Supplementary European Search Report for 18770677.5 mailed on May 7, 2020.

* cited by examiner

EXCAVATION INITIAL STAGE

EXCAVATION MIDDLE STAGE

EXCAVATION LATE STAGE

BOOM RAISING STAGE

SHOVEL, AND MANAGEMENT APPARATUS AND ASSIST DEVICE FOR SHOVEL

CROSS-REFERENCE TO RELATED APPLICATIONS

The present application is a continuation of U.S. patent application Ser. No. 16/575,860, filed on Sep. 19, 2019, which is a continuation application filed under 35 U.S.C. 111(a) claiming benefit under 35 U.S.C. 120 and 365(c) of PCT International Application No. PCT/JP2018/011395, filed on Mar. 22, 2018 and designating the U.S., which claims priority to Japanese Patent Applications No. 2017-056004, filed on Mar. 22, 2017, and No. 2017-061956, filed on Mar. 27, 2017. The entire contents of the foregoing applications are incorporated herein by reference.

BACKGROUND

Technical Field

The present invention relates to shovels.

Description of Related Art

A shovel having an excavation attachment composed of a boom, an aim, and a bucket is known. This shovel calculates an excavation reaction force acting on the leading edge of the bucket from the posture of the excavation attachment. The shovel automatically raises the boom when the excavation reaction force exceeds a predetermined value. This is for avoiding, by reducing the excavation depth, execution of an unnecessary excavating motion that would result in the bucket getting stuck.

SUMMARY

According to an aspect of the present invention, a shovel includes a lower traveling body, an upper turning body mounted on the lower traveling body, an attachment attached to the upper turning body, and a control device mounted on the upper turning body and configured to assist an excavating motion with the attachment. The control device is configured to derive a target excavation depth based on the hardness of an excavation target.

DETAILED DESCRIPTION

The above-described shovel, however, may reduce the weight of soil that enters the bucket in a single excavating motion by reducing the excavation depth, thus decreasing work efficiency.

According to an aspect of the present invention, a shovel that enables more efficient excavation is provided.

Figure 1:
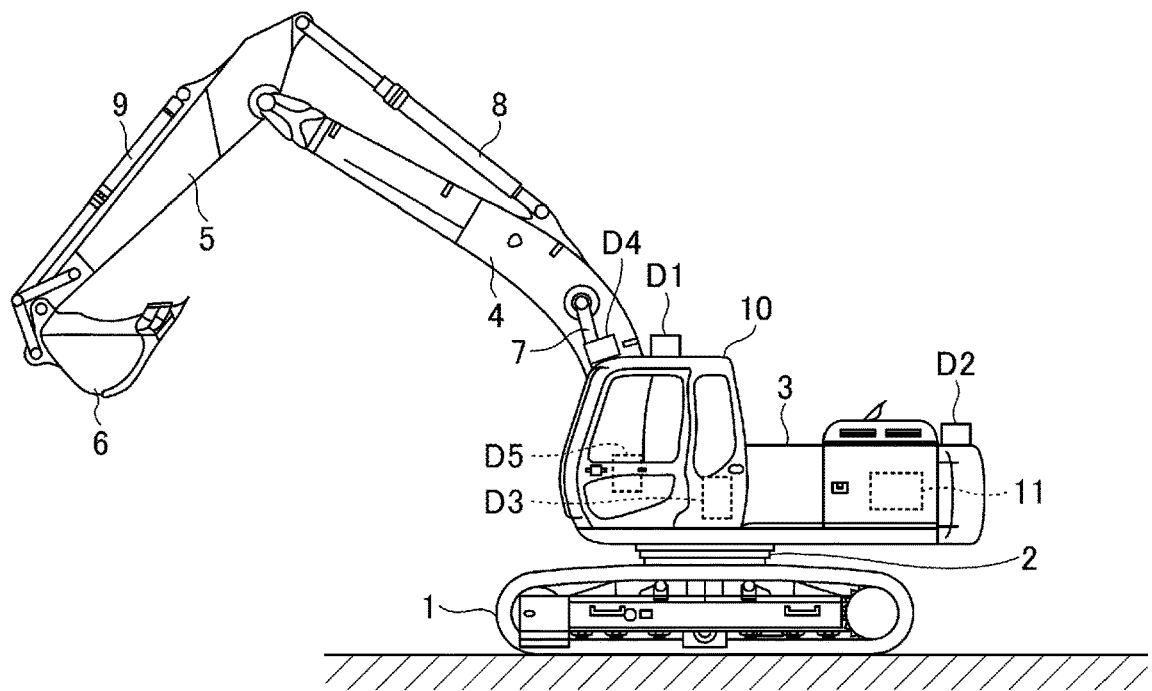
FIG. 1 is a side view of a shovel according to an embodiment of the present invention.

First, a shovel (excavator) as a construction machine according to an embodiment of the present invention is described with reference to FIG. 1. FIG. 1 is a side view of a shovel 100 according to an embodiment of the present invention. According to the shovel 100 illustrated in FIG. 1, an upper turning body 3 is mounted on a lower traveling body 1 via a turning mechanism 2. A boom 4 is attached to the upper turning body 3. An arm 5 is attached to the end of the boom 4, and a bucket 6 is attached to the end of the arm 5. The boom 4, the arm 5, and the bucket 6 as work elements constitute an excavation attachment that is an example of an attachment. The boom 4 is driven by a boom cylinder 7. The arm 5 is driven by an arm cylinder 8. The bucket 6 is driven by a bucket cylinder 9. A cabin 10 is provided on and a power source such as an engine 11 is mounted on the upper turning body 3. Information obtaining devices such as a communications device D1, a positioning device D2, a posture detecting device D3, an image capturing unit D4, and a cylinder pressure detecting device D5 are attached to the upper turning body 3.

The communications device D1 controls communications between the shovel 100 and external apparatuses. According to this embodiment, the communications device D1 controls radio communications between a GNSS (Global Navigation Satellite System) measurement system and the shovel 100. Specifically, the communications device D1 obtains the terrain information of a work site at the start of work by the shovel 100 at a frequency of, for example, once a day. The GNSS measurement system employs, for example, a network-type RTK-GNSS positioning system. Examples of external apparatuses include a management apparatus installed in a management center, a mobile terminal serving as an assist device, an aerial vehicle that flies around the shovel 100, etc.

The positioning device D2 is a device that measures the position and orientation of the shovel 100. According to this embodiment, the positioning device D2 is a GNSS receiver incorporating an electronic compass, and measures the latitude, longitude, and altitude of the location of the shovel 100 and measures the orientation of the shovel 100.

The posture detecting device D3 is a device that detects the posture of the attachment. According to this embodiment, the posture detecting device D3 is a device that detects the posture of the excavation attachment. The posture detecting device D3 may be a device that detects the posture of the upper turning body 3 and the posture of each of the boom 4, the arm 5, and the bucket 6 that constitute the excavation attachment.

The image capturing unit D4 obtains an image of an area surrounding the shovel 100. According to this embodiment, the image capturing unit D4 includes a front camera attached to the upper turning body 3. The front camera is a stereo camera that captures an image of an area in front of the shovel 100, and is attached to the roof of the cabin 10, namely, outside the cabin 10. The front camera may alternatively be attached to the ceiling of the cabin 10, namely, inside the cabin 10. The front camera can capture an image of the excavation attachment. The front camera may alternatively be a monocular camera. The image capturing unit D4 may be a monocular camera, a LIDAR, a laser radar, a millimeter wave radar, a sonar, or the like.

The cylinder pressure detecting device D5 detects the pressure of hydraulic oil in a hydraulic cylinder. According to this embodiment, the cylinder pressure detecting device D5 detects the pressure of hydraulic oil in each of the boom cylinder 7, the arm cylinder 8, and the bucket cylinder 9.

Figure 2:
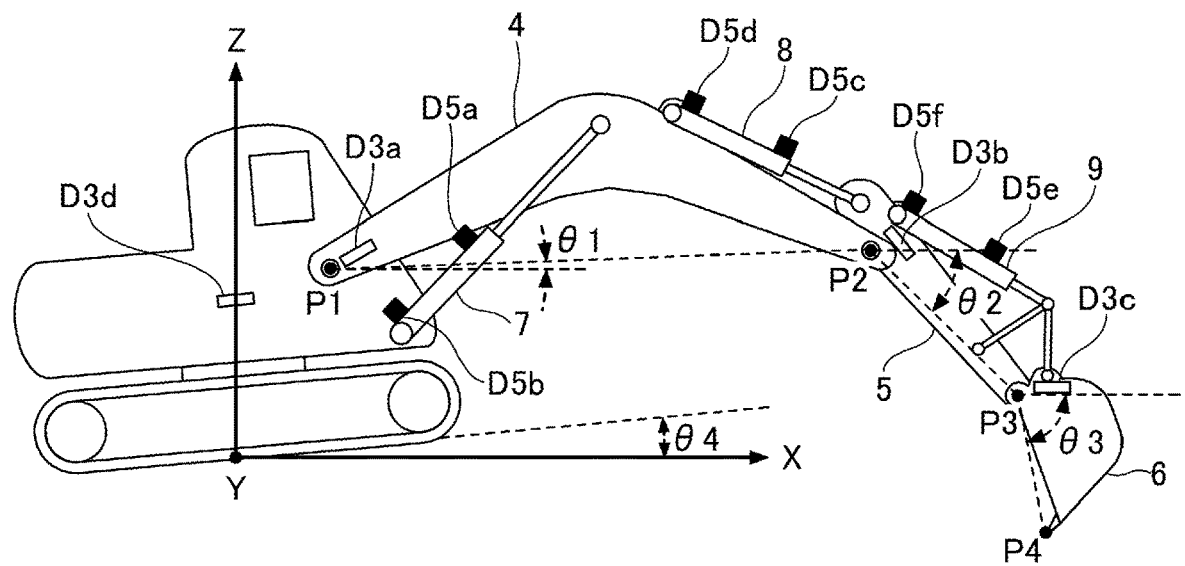
FIG. 2 is a side view of the shovel illustrating example outputs of various sensors constituting a posture detecting device installed in the shovel of FIG. 1.

FIG. 2 is a side view of the shovel 100, illustrating an example of an arrangement of various sensors constituting each of the posture detecting device D3 and the cylinder pressure detecting device D5 mounted on the shovel 100 of FIG. 1. Specifically, the posture detecting device D3 includes a boom angle sensor D3*a*, an arm angle sensor D3*b*, a bucket angle sensor D3*c*, and a body tilt sensor D3*d*. The cylinder pressure detecting device D5 includes a boom rod pressure sensor D5*a*, a boom bottom pressure sensor D5*b*, an arm rod pressure sensor D5*c*, an arm bottom pressure sensor D5*d*, a bucket rod pressure sensor D5*e*, and a bucket bottom pressure sensor D5*f*.

The boom angle sensor D3*a* is a sensor that obtains a boom angle. Examples of the boom angle sensor D3*a* include a rotation angle sensor that detects the rotation angle of a boom foot pin, a stroke sensor that detects the stroke amount of the boom cylinder 7, a tilt (acceleration) sensor that detects the inclination angle of the boom 4, etc. The boom angle sensor D3*a* obtains, for example, a boom angle $\theta 1$. The boom angle $\theta 1$ is the angle of a line segment P1-P2 connecting a boom foot pin position P1 and an arm link pin position P2 to a horizontal line in the XZ plane.

The arm angle sensor D3*b* is a sensor that detects an arm angle. Examples of the arm angle sensor D3*b* include a rotation angle sensor that detects the rotation angle of an arm link pin, a stroke sensor that detects the stroke amount of the arm cylinder 8, a tilt (acceleration) sensor that detects the inclination angle of the arm 5, etc. The arm angle sensor D3*b* obtains, for example, an arm angle $\theta 2$. The arm angle $\theta 2$ is the angle of a line segment P2-P3 connecting the arm link pin position P2 and a bucket link pin position P3 to a horizontal line in the XZ plane.

The bucket angle sensor D3*c* is a sensor that detects a bucket angle. Examples of the bucket angle sensor D3*c* include a rotation angle sensor that detects the rotation angle of a bucket link pin, a stroke sensor that detects the stroke amount of the bucket cylinder 9, a tilt (acceleration) sensor that detects the inclination angle of the bucket 6, etc. The bucket angle sensor D3*c* obtains, for example, a bucket angle $\theta 3$. The bucket angle $\theta 3$ is the angle of a line segment P3-P4 connecting the bucket link pin position P3 and a bucket teeth tips position P4 to a horizontal line in the XZ plane.

The boom angle sensor D3*a*, the arm angle sensor D3*b*, and the bucket angle sensor D3*c* may be composed of a combination of an acceleration sensor and a gyro sensor. The body tilt sensor D3*d* is a sensor that obtains the inclination angle $\theta 4$ of the shovel 100 around its Y axis and the inclination angle $\theta 5$ (not depicted) of the shovel 100 around its X axis, and includes, for example, a two-axis tilt (acceleration) sensor. The XY plane in FIG. 2 is a horizontal plane.

The boom rod pressure sensor D5*a* detects the pressure of the rod-side oil chamber of the boom cylinder 7 (hereinafter, "boom rod pressure"), and the boom bottom pressure sensor D5*b* detects the pressure of the bottom-side oil chamber of the boom cylinder 7 (hereinafter, "boom bottom pressure"). The arm rod pressure sensor D5*c* detects the pressure of the rod-side oil chamber of the arm cylinder 8 (hereinafter, "arm rod pressure"), and the arm bottom pressure sensor D5*d* detects the pressure of the bottom-side oil chamber of the arm cylinder 8 (hereinafter, "arm bottom pressure"). The bucket rod pressure sensor D5*e* detects the pressure of the rod-side oil chamber of the bucket cylinder 9 (hereinafter, "bucket rod pressure"), and the bucket bottom pressure sensor D5*f* detects the pressure of the bottom-side oil chamber of the bucket cylinder 9 (hereinafter, "bucket bottom pressure").

Figure 3:
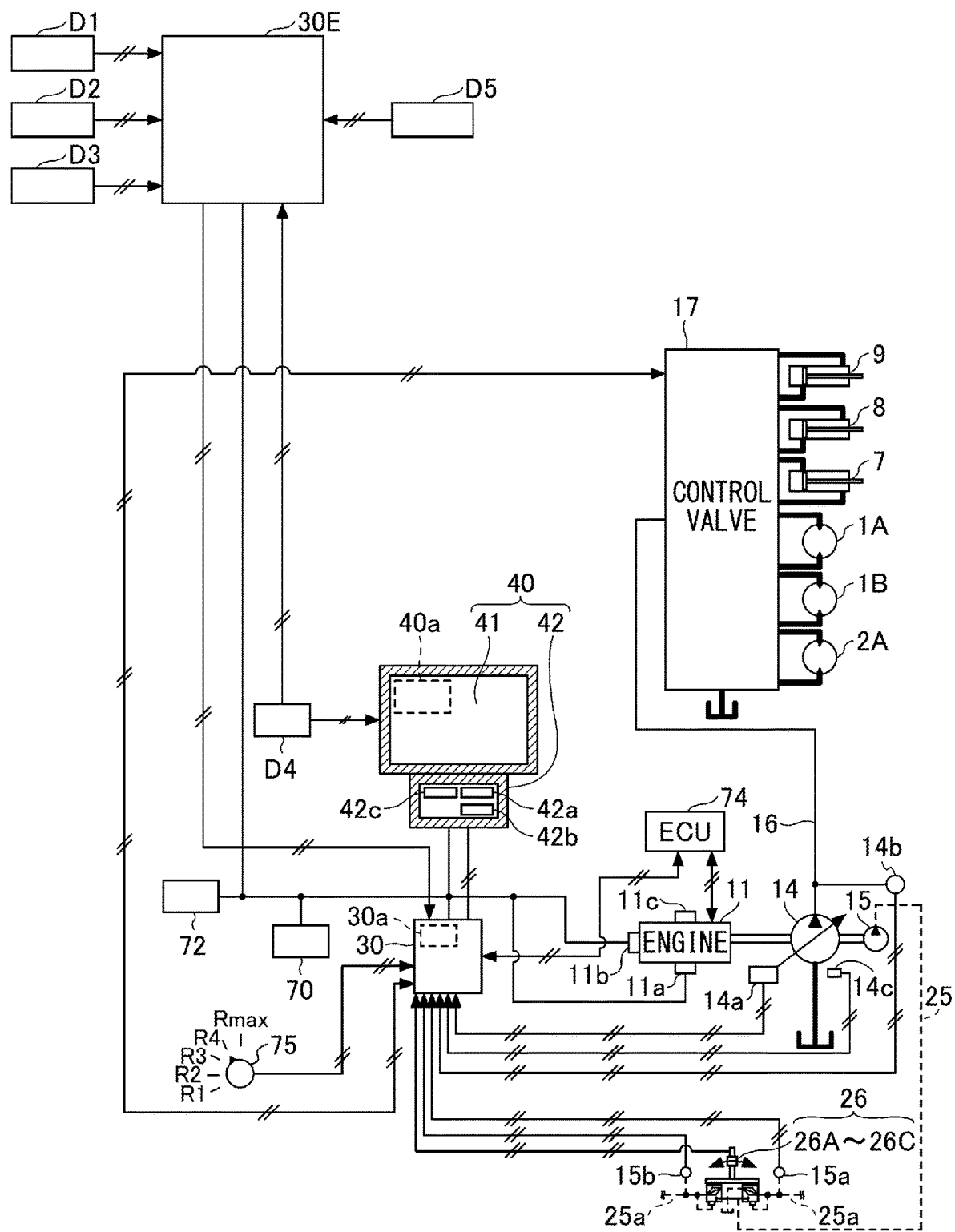
FIG. 3 is a diagram illustrating an example configuration of a basic system installed in the shovel of FIG. 1.

Next, a basic system of the shovel 100 is described with reference to FIG. 3. The basic system of the shovel 100 mainly includes the engine 11, a main pump 14, a pilot pump 15, a control valve 17, an operating apparatus 26, a controller 30, an engine control unit (ECU 74), etc.

The engine 11 is a drive source of the shovel 100, and is, for example, a diesel engine that operates in such a manner as to maintain a predetermined rotational speed. The output shaft of the engine 11 is connected to the input shaft of each of the main pump 14 and the pilot pump 15.

The main pump 14 is a hydraulic pump that supplies hydraulic oil to the control valve 17 via a hydraulic oil line 16, and is, for example, a swash plate variable displacement hydraulic pump. The main pump 14 can adjust the stroke length of a piston and change its discharge quantity, namely, pump output, by changing the angle (tilt angle) of a swash plate. The swash plate of the main pump 14 is controlled by a regulator 14*a*. The regulator 14*a* changes the tilt angle of the swash plate in accordance with a change in a control electric current output by the controller 30. For example, as the control electric current increases, the regulator 14*a* increases the tilt angle of the swash plate to increase the discharge quantity of the main pump 14. Furthermore, as the control electric current decreases, the regulator 14*a* decreases the tilt angle of the swash plate to decrease the discharge quantity of the main pump 14.

The pilot pump 15 is a hydraulic pump for supplying hydraulic oil to various hydraulic control apparatus via a pilot line 25, and is, for example, a fixed displacement hydraulic pump.

The control valve 17 is a hydraulic controller that controls the hydraulic system. The control valve 17 selectively supplies hydraulic oil supplied from the main pump 14 through the hydraulic oil line 16 to one or more of, for example, the boom cylinder 7, the arm cylinder 8, the bucket cylinder 9, a left traveling hydraulic motor 1A, a right traveling hydraulic motor 1B, and a turning hydraulic motor 2A. In the following description, the boom cylinder 7, the arm cylinder 8, the bucket cylinder 9, the left traveling hydraulic motor LA, the right traveling hydraulic motor 1B, and the turning hydraulic motor 2A are collectively referred to as "hydraulic actuators".

The operating apparatus 26 is an apparatus that an operator uses to operate the hydraulic actuators. The operating apparatus 26 receives hydraulic oil supplied from the pilot pump 15 via the pilot line 25. The operating apparatus 26 supplies the hydraulic oil to the pilot ports of flow control valves corresponding to the individual hydraulic actuators through a pilot line 25a. The pressure (pilot pressure) of the hydraulic oil supplied to each of the pilot ports is commensurate with the direction of operation and the amount of operation of a lever or one of pedals 26A through 26C for a corresponding hydraulic actuator.

The controller 30 is a control device for controlling the shovel 100, and is composed of, for example, a computer including a CPU, a RAM, a ROM, etc. The controller 30 reads programs corresponding to various functions from the ROM, loads the programs into the RAM, and causes the CPU to execute processes corresponding to the programs.

The controller 30 controls, for example, the discharge quantity of the main pump 14. Specifically, the controller 30 changes a control electric current to the regulator 14a in accordance with a negative control pressure at a negative control valve (not depicted), and controls the discharge quantity of the main pump 14 via the regulator 14a.

The ECU 74 controls the engine 11. The ECU 74 outputs the amount of fuel injection for controlling the rotational speed of the engine 11 to the engine 11 in accordance with an engine rotational speed (mode) that the operator set using an engine rotational speed adjustment dial 75, based on a command from the controller 30. The engine rotational speed adjustment dial 75 is a dial provided in the cabin 10 for adjusting the engine rotational speed, and according to this embodiment, can switch the engine rotational speed among the five levels of Rmax, R4, R3, R2, and R1. FIG. 3 illustrates that R4 is selected by the engine rotational speed adjustment dial 75.

Rmax is the highest rotational speed of the engine 11 and is selected when it is desired to give priority to workload. R4 is the second highest engine rotational speed and is selected when it is desired to balance workload and fuel efficiency. R3 and R2 are the third and the fourth highest engine rotational speed and are selected when it is desired to operate the shovel 100 at low noise while giving priority to fuel efficiency. R1 is the lowest engine rotational speed (idling rotational speed) and is the engine rotational speed in idling mode that is selected when it is desired to idle the engine 11. For example, Rmax (the highest rotational speed) may be set to 2000 rpm, R1 (idling rotational speed) may be set to 1000 rpm, and R4 (1750 rpm), R3 (1500 rpm), and R2 (1250 rpm) may be set at multiple levels at intervals of 250 rpm between them. The engine 11 is controlled to a constant rotational speed at an engine rotational speed set by the engine rotational speed adjustment dial 75. Here, the case of adjusting the engine rotational speed in five levels with the engine rotational speed adjustment dial 75 is illustrated, while the number of levels is not limited to five and may be any number.

In the shovel 100, an image display device 40 is placed near the operator seat of the cabin 10 to assist the operator's operation. The operator can input information and commands to the controller 30 using an input part 42 of the image display device 40. The controller 30 can provide the operator with information by displaying the operating situation, control information, etc., of the shovel 100 on an image display part 41 of the image display device 40.

The image display device 40 includes the image display part 41 and the input part 42. The image display device 40 is fixed to a console in the operator seat. Generally, the boom 4 is positioned on the right side of the operator seated in the operator seat, and the operator often operates the shovel 100 while visually recognizing the arm 5 and the bucket 6 attached to the end of the boom 4. While the right front frame of the cabin 10 is a portion that obstructs the operator's view, the image display device 40 is provided using this portion according to this embodiment. As a result, because the image display device 40 is placed on the portion that is an obstruction to the view from the beginning, the image display device 40 does not significantly obstruct the operator's view. Depending on the width of the frame, the image display device 40 may be so configured as to have the image display part 41 in portrait orientation such that the entire image display device 40 is within the width of the frame.

According to this embodiment, the image display device 40 is connected to the controller 30 via communications networks such as a CAN and a LIN. The image display device 40 may be connected to the controller 30 via a dedicated line.

The image display device 40 includes a conversion part 40a that generates an image to be displayed on the image display part 41. According to this embodiment, the conversion part 40a generates an image to be displayed on the image display part 41 based on the output of the image capturing unit D4 attached to the shovel 100. Therefore, the image capturing unit D4 is connected to the image display device 40 via a dedicated line, for example. The conversion part 40a may generate an image to be displayed on the image display part 41 based on the output of the controller 30.

The conversion part 40a may be implemented not as a function of the image display device 40 but as a function of the controller 30. In this case, the image capturing unit D4 is connected to the controller 30 instead of the image display device 40.

The image display device 40 includes a switch panel as the input part 42. The switch panel is a panel including various hardware switches. According to this embodiment, the switch panel includes a light switch 42a, a windshield wiper switch 42b, and a windshield washer switch 42c as hardware buttons. The light switch 42a is a switch for switching the on and off of lights attached outside the cabin 10. The windshield wiper switch 42b is a switch for switching the moving and stopping of a windshield wiper. The windshield washer switch 42c is a switch for spraying windshield washer fluid.

The image display device 40 is supplied with electric power from a rechargeable battery 70 to operate. The rechargeable battery 70 is charged with electric power generated by an alternator 11a (generator). The electric power of the rechargeable battery 70 is also supplied to electrical equipment 72, etc., of the shovel 100 besides the controller 30 and the image display device 40. A starter 11b of the engine 11 is driven with electric power from the rechargeable battery 70 to start the engine 11.

The engine 11 is controlled by the ECU 74 as described above. Various data indicating the condition of the engine 11 (for example, data indicating coolant water temperature (a physical quantity) detected with a water temperature sensor 11c) are constantly transmitted from the ECU 74 to the controller 30. Accordingly, the controller can store these data in a temporary storage part (memory) 30a and transmit the data to the image display device 40 when needed.

Data indicating the tilt angle of the swash plate are fed from the regulator 14a to the controller 30. Data indicating the discharge pressure of the main pump 14 are fed from a discharge pressure sensor 14b to the controller Data indicating the setting status of the engine rotational speed are fed from the engine rotational speed adjustment dial 75 to the controller 30. An oil temperature sensor 14c is provided in a conduit between a hydraulic oil tank and the main pump 14. Data representing the temperature of hydraulic oil flowing through the conduit are fed from the oil temperature sensor 14c to the controller 30.

A pilot pressure transmitted to the control valve 17 through the pilot line 25a when a lever or the pedals 26A through 26C are operated is detected by a hydraulic sensor 15a or 15b. Data indicating the pilot pressure are fed from the hydraulic sensor 15a or 15b to the controller 30. These data are stored in the temporary storage part 30a of the controller 30.

An external processing device 30E is a control device that performs various operations based on the outputs of the communications device D1, the positioning device D2, the posture detecting device D3, the image capturing unit D4, the cylinder pressure detecting device D5, etc., and outputs the operation results to the controller 30. According to this embodiment, the external processing device 30E is supplied with electric power from the rechargeable battery 70 to operate.

Figure 4:
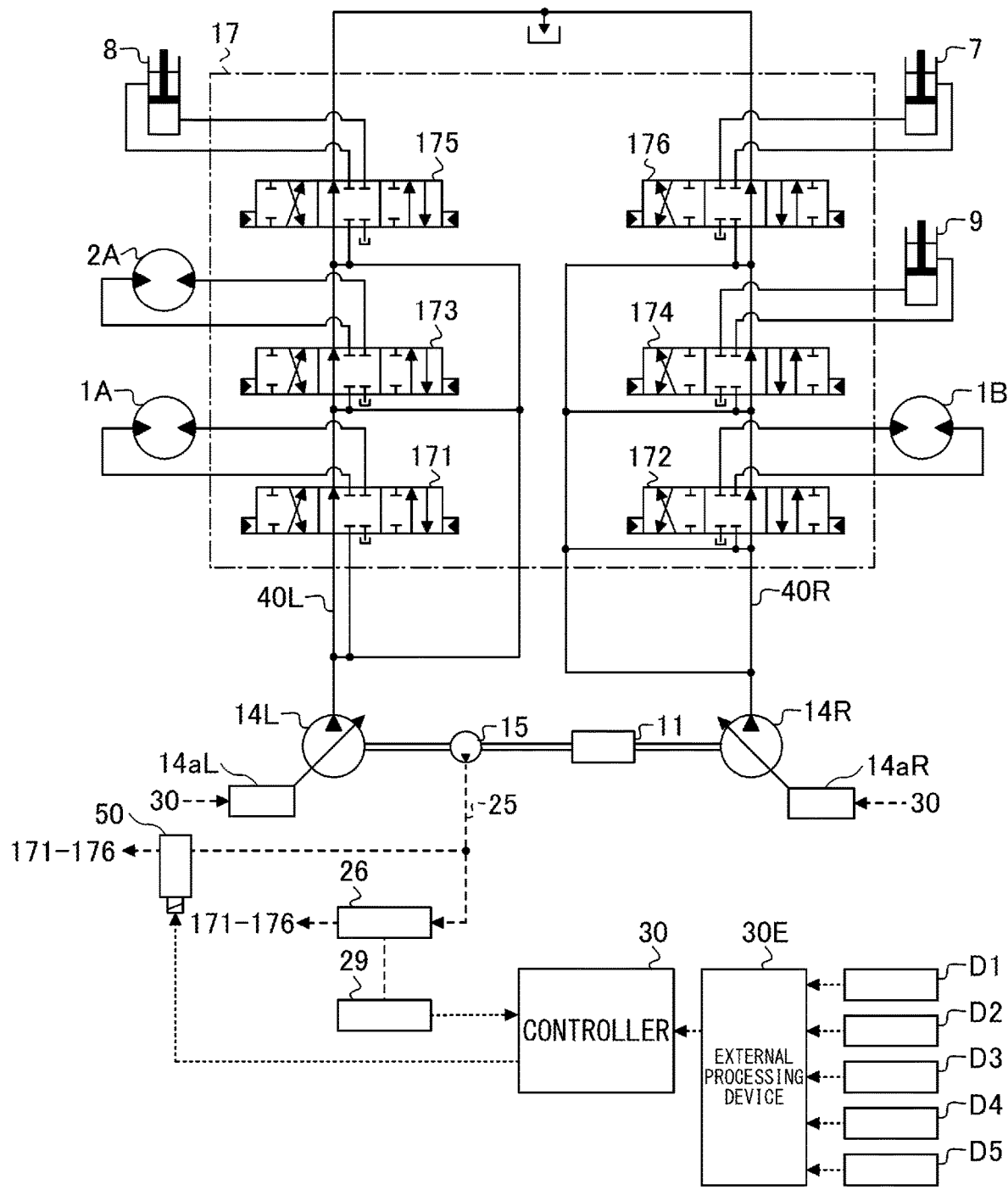
FIG. 4 is a diagram illustrating an example configuration of a drive system installed in the shovel of FIG. 1.

FIG. 4 is a diagram illustrating an example configuration of a drive system installed in the shovel 100 of FIG. 1, indicating a mechanical power transmission line, a hydraulic oil line, a pilot line, and an electric control line by a double line, a solid line, a dashed line, and a dotted line, respectively.

The drive system of the shovel 100 mainly includes the engine 11, main pumps 14L and 14R, discharge quantity adjusting devices 14aL and 14aR, the pilot pump the control valve 17, the operating apparatus 26, an operation details detecting device 29, the controller 30, the external processing device 30E, and a pilot pressure adjusting device 50.

The control valve 17 includes flow control valves 171 through 176 that control the flow of hydraulic oil discharged by the main pumps 14L and 14R. The control valve 17 selectively supplies hydraulic oil discharged by the main pumps 14L and 14R to one or more of the boom cylinder 7, the arm cylinder 8, the bucket cylinder 9, the left traveling hydraulic motor 1A, the right traveling hydraulic motor 1B, and the turning hydraulic motor 2A through the flow control valves 171 through 176.

The operating apparatus 26 is an apparatus that the operator uses to operate the hydraulic actuators. According to this embodiment, the operating apparatus 26 supplies hydraulic oil discharged by the pilot pump 15 to the pilot ports of the flow control valves corresponding to the individual hydraulic actuators through the pilot line 25.

The operation details detecting device 29 is a device that detects the details of the operator's operation using the operating apparatus 26. According to this embodiment, the operation details detecting device 29 detects the direction of operation and the amount of operation of a lever or a pedal of the operating apparatus 26 for a corresponding hydraulic actuator in the form of pressure, and outputs the detected value to the controller 30. The operation details of the operating apparatus 26 may be derived using the output of a sensor other than a pressure sensor, such as a potentiometer.

The main pumps 14L and 14R driven by the engine 11 circulate hydraulic oil to the hydraulic oil tank via center bypass conduits 40L and 40R, respectively.

The center bypass conduit 40L is a hydraulic oil line passing through the flow control valves 171, 173, and 175 placed in the control valve 17, and the center bypass conduit 40R is a hydraulic oil line passing through the flow control valves 172, 174, and 176 placed in the control valve 17.

The flow control valves 171, 172, and 173 are spool valves that control the flow rate and the flow direction of hydraulic oil flowing into and out of the left traveling hydraulic motor LA, the right traveling hydraulic motor 1B, and the turning hydraulic motor 2A.

The flow control valves 174, 175, and 176 are spool valves that control the flow rate and the flow direction of hydraulic oil flowing into and out of the bucket cylinder 9, the arm cylinder 8, and the boom cylinder 7.

The discharge quantity adjusting devices 14aL and 14aR are functional elements that adjust the discharge quantity of the main pumps 14L and 14R. According to this embodiment, the discharge quantity adjusting device 14aL is a regulator, and adjusts the discharge quantity of the main pump 14L by increasing or decreasing the geometric displacement of the main pump 14L by increasing or decreasing the swash plate tilt angle of the main pump 14L in accordance with a control command from the controller Specifically, the discharge quantity adjusting device 14aL increases the discharge quantity of the main pump 14L by increasing the geometric displacement by increasing the swash plate tilt angle as a control electric current output by the controller 30 increases. The same is true for adjusting the discharge quantity of the main pump 14R by the discharge quantity adjusting device 14aR.

The pilot pressure adjusting device 50 is a functional element that adjusts a pilot pressure supplied to the pilot ports of the flow control valves. According to this embodiment, the pilot pressure adjusting device 50 is a reducing valve that increases or decreases a pilot pressure using hydraulic oil discharged by the pilot pump 15 in accordance with a control electric current output by the controller 30. According to this configuration, the pilot pressure adjusting device 50 can open and close the bucket 6 in accordance with a control electric current from the controller 30 regardless of the operator's operation of a bucket operating lever, for example. In addition, the pilot pressure adjusting device 50 can raise and lower the boom 4 in accordance with a control electric current from the controller 30 regardless of the operator's operation of a boom operating levers. The same applies to the forward and backward movements of the lower traveling body 1, the left turning and right turning of the upper turning body 3, the opening and closing of the arm 5, etc.

Figure 5:
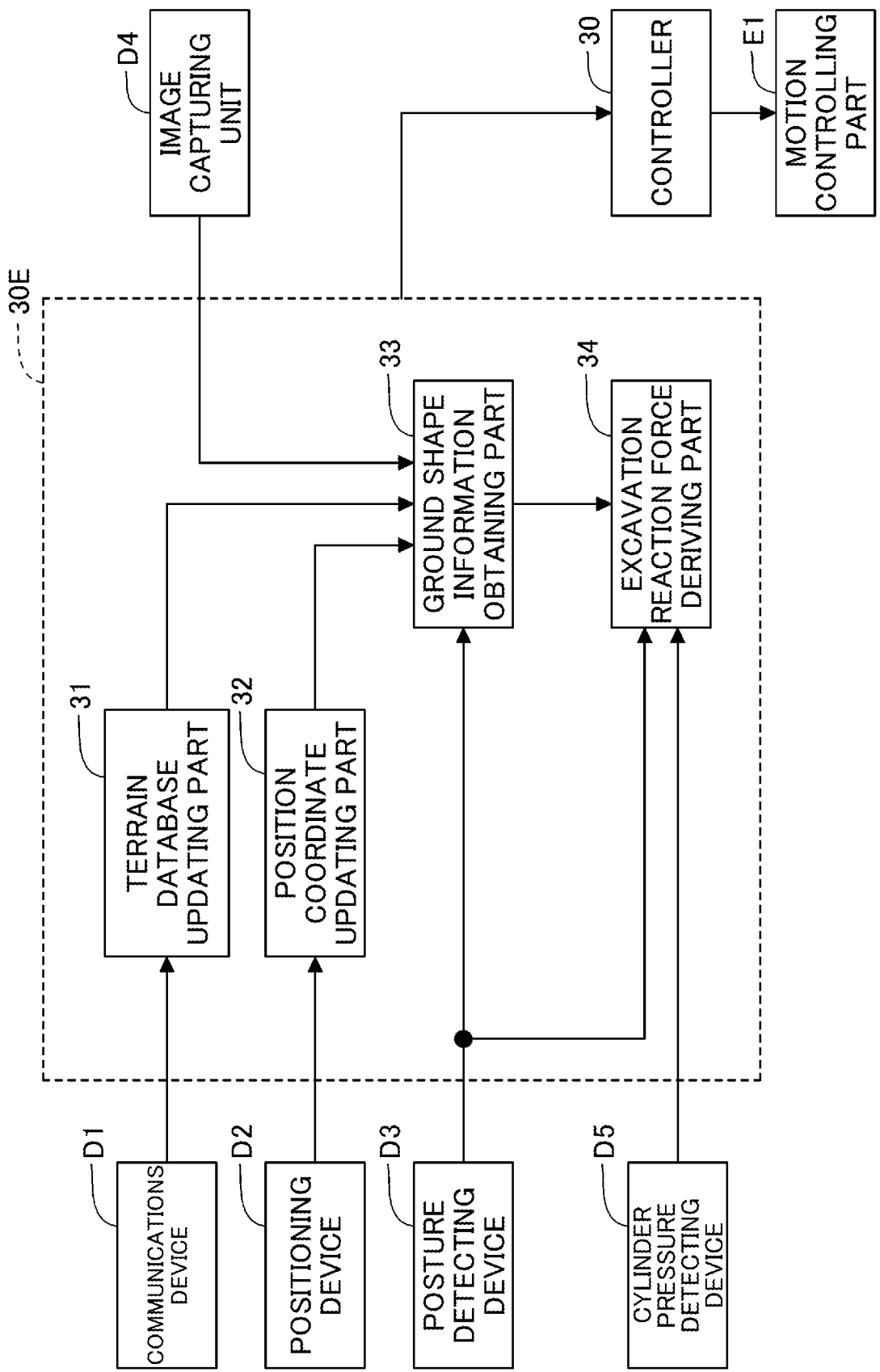
FIG. 5 is a functional block diagram illustrating an example configuration of an external processing device.

Next, functions of the external processing device are described with reference to FIG. 5. FIG. 5 is a functional block diagram illustrating an example configuration of the external processing device 30E. According to this embodiment, the external processing device 30E receives the outputs of the communications device D1, the positioning device D2, the posture detecting device D3, the image capturing unit D4, and the cylinder pressure detecting device D5 to perform various operations, and outputs the operation results to the controller 30. For example, the controller 30 outputs a control command corresponding to the operation results to a motion controlling part E1.

The motion controlling part E1 is a functional element for controlling the motion of the attachment, and includes, for example, the pilot pressure adjusting device the flow control valves 171 through 176, etc. When the flow control valves 171 through 176 are configured to operate in response to an electrical signal, the controller transmits an electrical signal directly to the flow control valves 171 through 176.

The motion controlling part E1 may include an informing device that informs the operator of the shovel 100 that the motion of the attachment has been automatically adjusted. Examples of the informing device include an audio output device, an LED lamp, etc.

Specifically, the external processing device 30E mainly includes a terrain database updating part 31, a position coordinate updating part 32, a ground shape information obtaining part 33, and an excavation reaction force deriving part 34.

The terrain database updating part 31 is a functional element that updates a terrain database which systematically stores the terrain information of a work site in a referable manner. According to this embodiment, the terrain database updating part 31 obtains the terrain information of a work site through the communications device D1 and updates the terrain database at the time of starting the shovel 100, for example. The terrain database is stored in a nonvolatile memory or the like. The terrain information of a work site is described in a three-dimensional terrain model based on the Global Positioning System, for example.

The position coordinate updating part 32 is a functional element that updates the coordinates of the shovel 100 representing its current position and the orientation of the shovel 100. According to this embodiment, the position coordinate updating part 32 obtains the position coordinates and the orientation of the shovel 100 in the Global Positioning System based on the output of the positioning device D2, and updates data on the coordinates of the shovel 100 representing its current position and the orientation of the shovel 100 stored in a nonvolatile memory or the like.

The ground shape information obtaining part 33 is a functional element that obtains information on the current shape of the ground to be worked on. According to this embodiment, the ground shape information obtaining part 33 obtains information on the current shape of the excavation target ground based on the terrain information updated by the terrain database updating part 31, the coordinates of the shovel 100 representing its current position and the orientation of the shovel 100 updated by the position coordinate updating part 32, and the historical transition of the posture of the excavation attachment detected by the posture detecting device D3.

Figure 6:
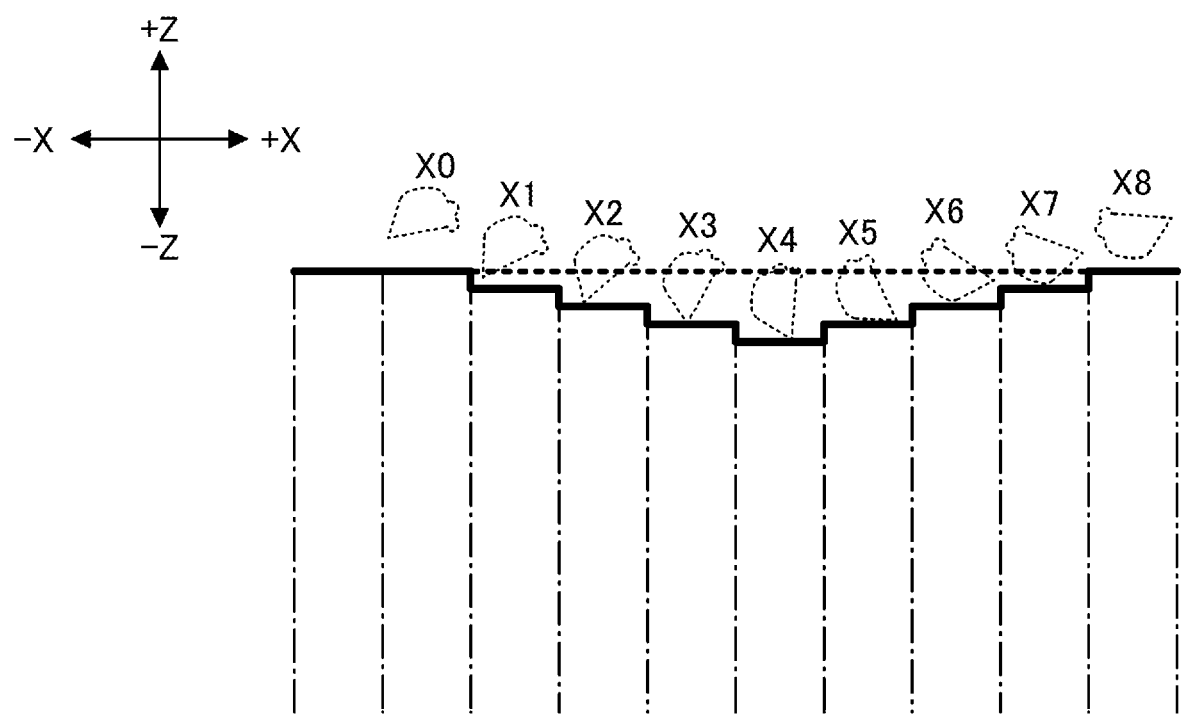
FIG. 6 is a concept diagram of information on the current terrain of the ground to be excavated obtained by a ground shape information obtaining part.

Here, a process of obtaining information on a ground shape after an excavating motion by the ground shape information obtaining part 33 is described with reference to FIG. 6. FIG. 6 is a concept diagram of information on a ground shape after an excavating motion. Multiple bucket shapes XO through X8 indicated by a dashed line in FIG. 6 represent the trajectory of the bucket 6 during the previous excavating motion. The trajectory of the bucket 6 is derived from the transition of the posture of the excavation attachment previously detected by the posture detecting device D3. The thick solid line in FIG. 6 represents the current cross-sectional shape of the excavation target ground determined by the ground shape information obtaining part 33, and the thick dotted line represents the cross-sectional shape of the excavation target ground before performance of the previous excavating motion determined by the ground shape information obtaining part 33. That is, the ground shape information obtaining part 33 derives the current shape of the excavation target ground by removing a portion corresponding to the space passed through by the bucket 6 during the previous excavating motion from the shape of the excavation target ground before performance of the previous excavating motion. The ground shape information obtaining part 33 can thus estimate the ground shape after an excavating motion. In addition, each block extending in a Z-axis direction indicated by a one-dot chain line in FIG. 6 represents each element of the three-dimensional terrain model. Each element is represented by, for example, a model having an upper surface of a unit area parallel to the XY plane and an infinite length in the –Z direction. The three-dimensional terrain model may be represented by a three-dimensional mesh model.

The ground shape information obtaining part 33 may obtain information on the current shape of the excavation target ground based on an image of an area surrounding the shovel 100 captured by the image capturing unit D4. The ground shape information obtaining part 33 may obtain information on the current shape of the excavation target ground based on the output of a distance measuring device such as a laser range finder, a laser scanner, a distance image sensor, or the like.

The excavation reaction force deriving part 34 is a functional element that derives an excavation reaction force. The excavation reaction force deriving part 34 derives the excavation reaction force based on, for example, the posture of the excavation attachment and information on the current shape of the excavation target ground. The posture of the excavation attachment is detected by the posture detecting device D3, and the information on the current shape of the excavation target ground is obtained by the ground shape information obtaining part 33. The excavation reaction force deriving part 34 may derive the excavation reaction force based on the posture of the excavation attachment and information output by the cylinder pressure detecting device D5.

According to this embodiment, the excavation reaction force deriving part 34 derives the excavation reaction force at predetermined operation intervals using a predetermined calculation formula. For example, the excavation reaction force deriving part 34 derives the excavation reaction force such that the excavation reaction force increases as the excavation depth increases, that is, as the vertical distance between the ground contact surface of the shovel 100 and the bucket teeth tips position P4 (see FIG. 2) increases. Furthermore, the excavation reaction force deriving part 34 derives the excavation reaction force such that, for example, the excavation reaction force increases as the ground insertion depth of the teeth tips of the bucket 6 relative to the excavation target ground increases. The excavation reaction force deriving part 34 may also derive the excavation reaction force in consideration of soil characteristics such as soil density. The soil characteristics may be values input by the operator through an in-vehicle input device (not depicted) or may be values automatically calculated based on the outputs of various sensors such as a cylinder pressure sensor.

The excavation reaction force deriving part 34 may determine whether excavation is in progress based on the posture of the excavation attachment and information on the current shape of the excavation target ground, and output the determination result to the controller 30. For example, the excavation reaction force deriving part 34 determines that excavation is in progress when the vertical distance between the bucket teeth tips position P4 (see FIG. 2) and the excavation target ground is less than or equal to a predetermined value. The excavation reaction force deriving part 34 may also determine that excavation is in progress before the teeth tips of the bucket 6 contact the excavation target ground.

In response to the excavation reaction force deriving part 34 determining that excavation is in progress, the external processing device 30E derives a current excavation stage based on the details of the operator's operation. The external processing device 30E may determine whether excavation is in progress based on the posture of the excavation attachment and information on the current shape of the excavation target ground. According to this embodiment, the external processing device 30E derives the current excavation stage based on the operation details output by the operating apparatus 26.

The external processing device 30E calculates a bucket teeth tips angle α based on the output of the posture detecting device D3 and information on the current shape of the excavation target ground. The bucket teeth tips angle α is the angle of the teeth tips of the bucket 6 to the excavation target ground.

Figure 7A:
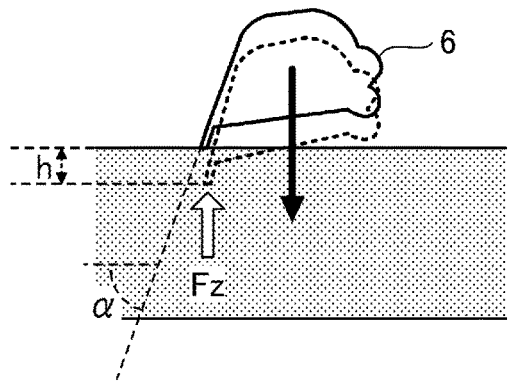
FIGS. 7A through 7D are diagrams illustrating an excavation stage.
Figure 7B:
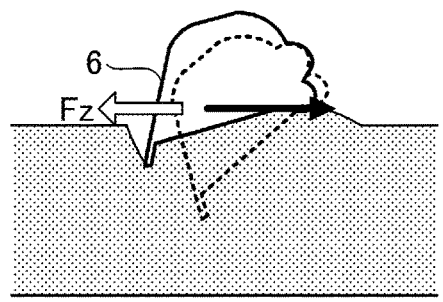
Figure 7C:
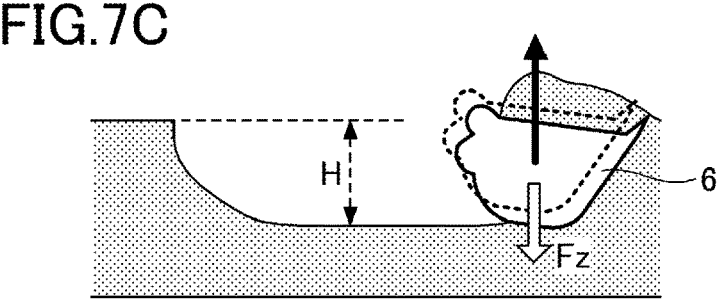
Figure 7D:
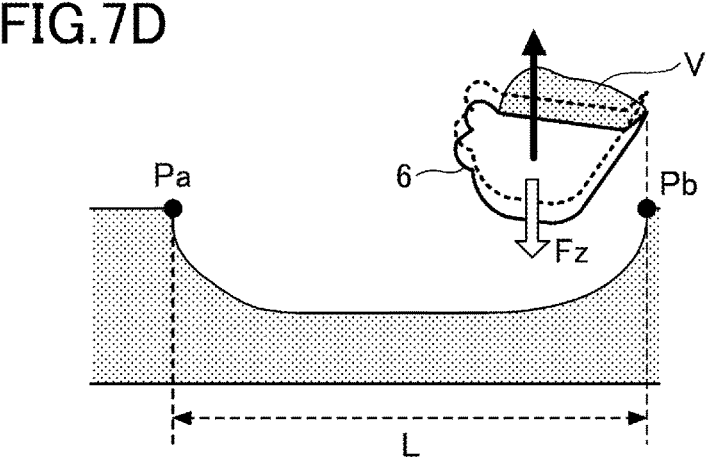

Here, an excavation stage including the three stages of an excavation initial stage, an excavation middle stage, and an excavation late stage is described with reference to FIGS. 7A through 7D. FIGS. 7A through 7D are diagrams illustrating the excavation stage. FIG. 7A illustrates the relationship between the bucket 6 and the excavation target ground at the excavation initial stage, FIG. 7B illustrates the relationship between the bucket 6 and the excavation target ground at the excavation middle stage, and FIG. 7C illustrates the relationship between the bucket 6 and the excavation target ground at the excavation late stage. FIG. 7D illustrates the relationship between the bucket 6 and the excavation target ground at the stage of boom raising performed after the excavation stage.

The excavation initial stage means the stage of moving the bucket 6 vertically downward as indicated by the arrow of FIG. 7A. Therefore, an excavation reaction force Fz during the excavation initial stage is composed mainly of insertion resistance at the time of inserting the teeth tips of the bucket 6 into the excavation target ground, and is basically directed vertically upward. Furthermore, the insertion resistance increases as a ground insertion depth h of the teeth tips of the bucket 6 increases.

Furthermore, the ground insertion depth h of the teeth tips of the bucket 6 being the same, the insertion resistance is lowest when the bucket teeth tips angle α is approximately degrees. For example, in response to determining that a boom lowering operation is being performed during excavation, the external processing device 30E determines that a current excavation stage is the excavation initial stage. The excavating motion at the excavation initial stage is implemented by a predetermined motion. The predetermined motion is preferably performed with a predetermined posture of the excavation attachment and at a predetermined insertion rate. This is because a change in the posture of the excavation attachment or the insertion rate during insertion may vary the resulting derived insertion resistance.

The excavation middle stage means the stage of drawing the bucket 6 toward the body of the shovel 100 as indicated by the arrow of FIG. 7B. Therefore, the excavation reaction force Fz during the excavation middle stage is composed mainly of shear resistance to the slip failure of the excavation target ground, and is basically directed away from the body. For example, in response to determining that an arm closing operation is being performed during excavation, the external processing device determines that a current excavation stage is the excavation middle stage. Alternatively, the external processing device 30E may determine that a current excavation stage is the excavation middle stage in response to determining that a boom lowering operation is not being performed and an arm closing operation is being performed during excavation.

The excavation reaction force Fz during the excavation middle stage increases as the bucket teeth tips angle α decreases because the slip failure of the excavation target ground becomes less likely to occur as the bucket teeth tips angle α decreases. Conversely, the excavation reaction force Fz during the excavation middle stage decreases as the bucket teeth tips angle α increases because the slip failure of the excavation target ground becomes more likely to occur as the bucket teeth tips angle α increases. When the bucket teeth tips angle α is greater than 90 degrees, the amount of excavation decreases as the bucket teeth tips angle α increases.

The excavation late stage means the stage of lifting the bucket 6 vertically upward as indicated by the arrow of FIG. 7C. Therefore, the excavation reaction force Fz during the excavation late stage is composed mainly of the weight of soil or the like contained in the bucket 6, and is basically directed vertically downward. For example, in response to determining that a boom raising operation is being performed during excavation, the external processing device 30E determines that a current excavation stage is the excavation late stage.

Alternatively, the external processing device 30E may determine that a current excavation stage is the excavation late stage in response to determining that an arm closing operation is not being performed and a boom raising operation is being performed during excavation.

The external processing device 30E derives the hardness of the ground to be excavated (including, for example, the characteristics of soil, rock, gravel, or the like) based on the insertion depth h of the teeth tips of the bucket 6 and the insertion resistance (excavation reaction force Fz) at the excavation initial stage. According to this embodiment, the external processing device 30E derives a hardness K of the excavation target, referring to a hardness table storing the correspondence relationship between the insertion depth h, the excavation reaction force Fz, and the hardness K. The hardness K may be derived using a predetermined calculation formula.

The insertion depth h is derived, for example, based on the bucket teeth tips position P4 and information on the current shape of the excavation target ground by the excavation reaction force deriving part 34. The excavation reaction force Fz is derived, for example, based on the posture of the excavation attachment and information output by the cylinder pressure detecting device D5 by the excavation reaction force deriving part 34.

Figure 8:
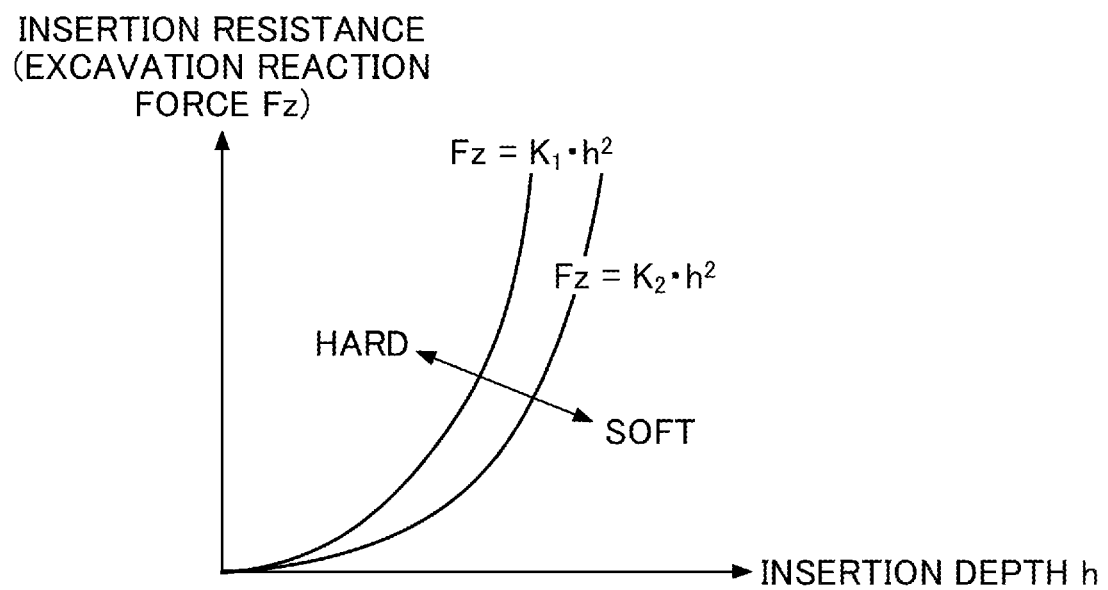
FIG. 8 is a graph representing a correspondence relationship stored in a hardness table.

FIG. 8 is a graph showing the correspondence relationship stored in the hardness table, where the vertical axis represents the insertion resistance (excavation reaction force Fz) and the horizontal axis represents the insertion depth h.

As illustrated in FIG. 8, the insertion resistance (excavation reaction force Fz) is expressed, for example, as a function proportional to the square of the insertion depth h. Coefficients $K_1$ and $K_2$ are examples of the hardness K, and a greater value indicates higher hardness.

The external processing device 30E derives the hardness K based on the insertion depth h and the insertion resistance (excavation reaction force Fz) derived by the excavation reaction force deriving part 34 and the correspondence relationship as illustrated in FIG. 8. Instead of deriving the hardness K of the excavation target as a numerical value, the external processing device 30E may select the hardness K of the excavation target from multiple hardness levels. The external processing device may estimate the hardness K based on the detected value of the cylinder pressure detecting device D5. In this case, the external processing device 30E may estimate the hardness K based on a change in a bucket cylinder pressure, an arm cylinder pressure, or a boom cylinder pressure if the posture of the excavation attachment during insertion is a predetermined posture.

Thereafter, the external processing device 30E derives a target excavation depth H based on the hardness K of the excavation target. The target excavation depth H means an excavation depth at which an efficient excavating motion can be achieved without causing a situation where the bucket 6 is immobilized during an excavating motion. That is, if the actual excavation depth exceeds the target excavation depth H, the movement of the bucket 6 may be slowed or stopped. The target excavation depth H is prestored in, for example, the ROM or the like in association with the hardness K of the excavation target. The target excavation depth H is so set as to be smaller as the excavation target is harder, for example. FIG. 7C illustrates a state after excavation has been appropriately performed in such a manner as to cause the excavation depth to be the target excavation depth H. The target excavation depth H may be set in association with the attitude of the shovel 100, the posture of the bucket 6, etc., in addition to the hardness K of the excavation target. For example, the target excavation depth H may be so set as to decrease as the turning radius increases because of the extension of the excavation attachment.

The external processing device 30E derives a target excavation volume Vt commensurate with the allowable load weight of the bucket 6 based on the hardness K of the excavation target. The allowable load weight of the bucket 6 means the maximum weight of the excavation target that can be lifted using the bucket 6. The allowable load weight is prestored in, for example, the ROM or the like in association with the type, operation mode, etc., of the shovel 100. The target excavation volume Vt means the excavation volume (target value) of the excavation target to be excavated by a single excavating motion. For example, the target excavation volume Vt is the volume (target value) of soil discharged by the bucket 6 in a single excavating motion.

The "target excavation volume Vt commensurate with the allowable load weight of the bucket 6" differs depending on the unit volume weight (density p) of the excavation target, and specifically, decreases as the density p increases and increases as the density p decreases. Therefore, the external processing device 30E derives the density p based on the hardness K. The density p is prestored in, for example, the ROM or the like in association with the hardness K of the excavation target. For example, the density p is so set as to be higher as the excavation target is harder. That is, the "target excavation volume Vt commensurate with the allowable load weight of the bucket 6" is so set as to be smaller as the excavation target is harder.

Thereafter, the external processing device 30E derives a target excavation length L from the target excavation depth H and the target excavation volume Vt. The target excavation length L is a length along the longitudinal axis of the upper turning body 3. The target excavation length L may be restricted by the attitude of the shovel 100. The target excavation volume Vt is, for example, substantially equal to a volume V of the space determined by the target excavation depth H, the target excavation length L, and a bucket width W. The bucket width W is the length of the bucket 6 in a lateral axis direction of the upper turning body 3. The target excavation volume Vt may be derived as a value obtained by multiplying the volume V by a collection rate η. The collection rate η represents the ratio of the volume of the excavation target in the bucket 6 to the volume of the excavation target excavated by the bucket 6. The collection rate η may be a prestored value or may be a value set at any time. FIG. 7D illustrates a state after excavation has been appropriately performed in such a manner as to cause the excavation length to be the target excavation length L. Specifically, FIG. 7D illustrates that a horizontal distance from a position Pa where the teeth tips of the bucket 6 enter the excavation target during the excavation initial stage to a position Pb where the teeth tips of the bucket 6 exit the excavation target during the excavation late stage is the target excavation length L. FIG. 7D also illustrates a state after excavation has been appropriately performed in such a manner as to cause the excavation volume to be the target excavation volume Vt (=the target excavation depth H×the target excavation length L×the bucket width W×the collection rate η).

When a target work surface is set as a finished surface, the external processing device 30E may derive multiple target excavation depths H stepwise between a current excavation surface (ground surface) and the target work surface. The controller 30 of the shovel 100 can thus perform such control as to prevent the teeth tips of the bucket 6, which are a working part, from exceeding the target excavation depths H set in a stepwise manner.

Figure 9:
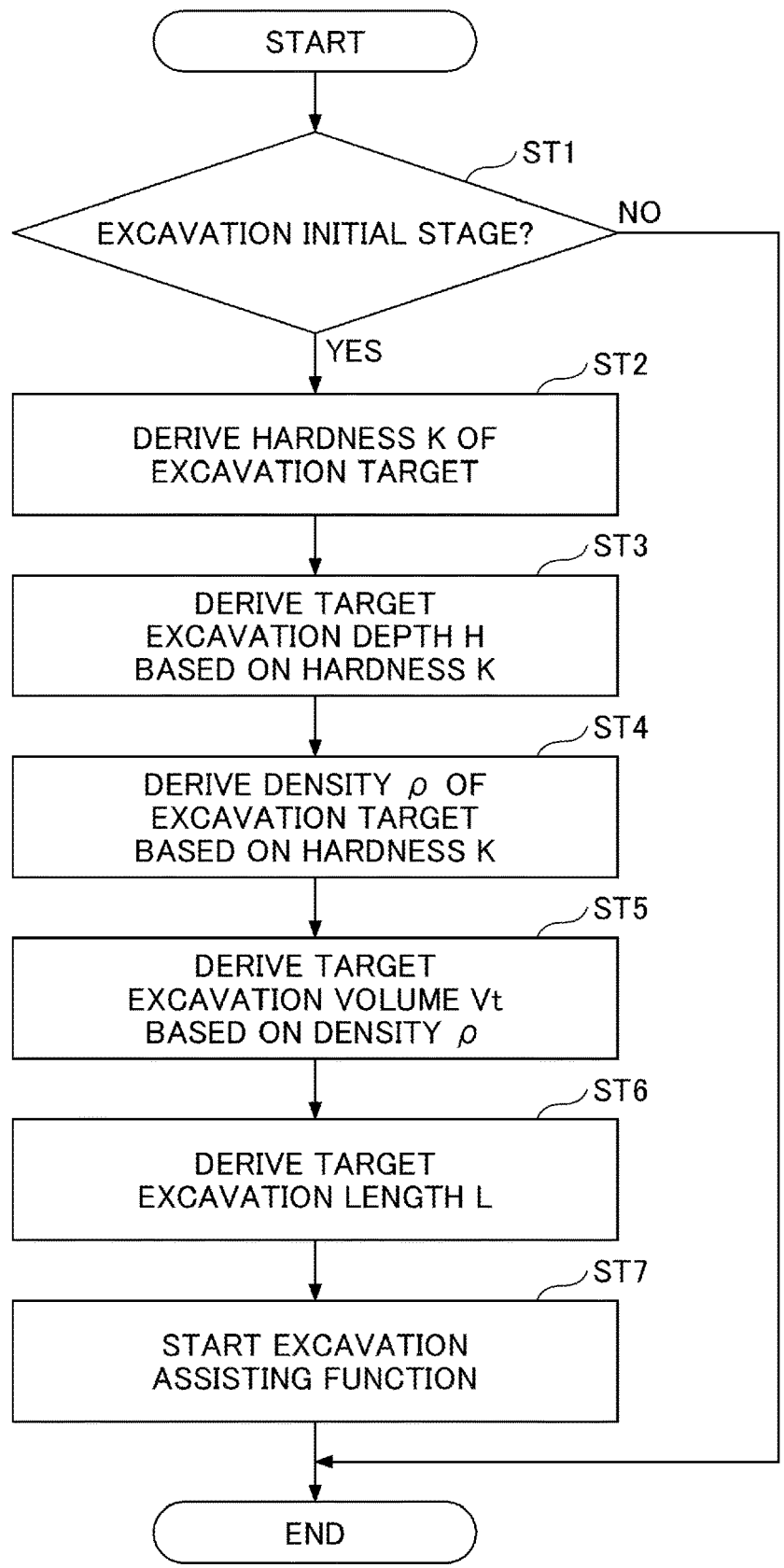
FIG. 9 is a flowchart illustrating an example of an excavation assisting process.

Next, a process of assisting an excavating motion with the excavation attachment by the external processing device 30E (hereinafter, "excavation assisting process") is described with reference to FIG. 9. FIG. 9 is a flowchart illustrating an example of the excavation assisting process. The external processing device 30E repeatedly executes this excavation assisting process at predetermined control intervals while the shovel 100 is in operation. The external processing device 30E may execute it only when determining that the shovel 100 is performing excavation.

First, the external processing device 30E determines whether a current excavation stage is the excavation initial stage (step ST1). According to this embodiment, in response to determining that a boom lowering operation is being performed during excavation, the external processing device 30E determines that a current excavation stage is the excavation initial stage.

In response to determining that a current excavation stage is not the excavation initial stage (NO at step ST1), the external processing device 30E ends the excavation assisting process of this time.

In response to determining that a current excavation stage is the excavation initial stage (YES at step ST1), the external processing device 30E derives the hardness K of the excavation target (step ST2). According to this embodiment, the external processing device 30E derives the hardness K of the excavation target, referring to the hardness table storing the correspondence relationship between the insertion depth h, the excavation reaction force Fz, and the hardness K. When multiple hardnesses K are derived in a short time, the average of these may be set as the hardness K or the latest value may be set as the hardness K. The same applies to other parameters such as the target excavation depth H.

Thereafter, the external processing device 30E derives the target excavation depth H based on the hardness K of the excavation target (step ST3). According to this embodiment, the external processing device 30E derives the target excavation depth H, referring to a target excavation depth table storing the correspondence relationship between the hardness K and the target excavation depth H. The target excavation depth H may be derived using a predetermined calculation formula.

Thereafter, the external processing device 30E derives the unit volume weight (density p) of the excavation target based on the hardness K of the excavation target (step ST4). According to this embodiment, the external processing device 30E derives the density p, referring to a density table storing the correspondence relationship between the hardness K and the density p. The density p may be derived using a predetermined calculation formula.

Thereafter, the external processing device 30E derives the target excavation volume Vt based on the density p (step ST5). The target excavation volume Vt is derived as a value less than or equal to the allowable load volume of the bucket 6. The allowable load volume of the bucket 6 means the maximum volume of the excavation target that can be lifted using the bucket 6. According to this embodiment, the external processing device 30E derives the target excavation volume Vt from the allowable load weight of the bucket 6 and the density p. The allowable load weight of the bucket 6 means the maximum weight of the excavation target that can be lifted using the bucket 6. Each of the allowable load volume and the allowable load weight of the bucket 6 may be a value that differs depending on the operation mode or the like of the shovel 100. The external processing device 30E may derive the target excavation volume Vt from a predetermined load weight less than the allowable load weight and the density p.

Thereafter, the external processing device 30E derives the target excavation length L (step ST6). According to this embodiment, the external processing device 30E derives the target excavation length L from the target excavation depth H, the target excavation volume Vt, the collection rate η, and the bucket width W. This is because the target excavation volume Vt is expressed by H×L×W×η. The collection rate η and the bucket width W are, for example, prestored values.

Thereafter, the external processing device 30E starts an excavation assisting function (step ST7). According to this embodiment, in response to determining that a current excavation stage is the excavation middle stage, for example, while a boom lowering operation is stopped and an arm closing operation is being performed, the external processing device 30E starts the excavation assisting function.

The excavation assisting function is, for example, a function to assist an excavating motion by causing the excavation attachment to operate semi-automatically. In this case, for example, the external processing device 30E automatically raises or lowers the boom 4 so as to cause the excavation depth from the latest excavation surface (ground surface) that is a current excavation surface to be the target excavation depth H, while an arm closing operation is being performed during the excavation middle stage. The external processing device 30E may automatically open or close the bucket 6. Specifically, when the excavation depth is likely to exceed the target excavation depth H, the external processing device 30E may automatically raise the boom 4 so as to prevent the target excavation depth H from being exceeded. Alternatively, when the excavation depth is unlikely to reach the target excavation depth H, the external processing device 30E may automatically lower the boom 4 so that the target excavation depth H is reached. The same applies to the opening and closing of the bucket 6. Furthermore, the external processing device 30E may adjust the closing speed of the arm 5.

The external processing device 30E automatically raises or lowers the boom 4 so as to cause the excavation length to be the target excavation length L, while an arm closing operation is being performed during the excavation middle stage. The external processing device 30E may automatically open or close the bucket 6. Specifically, when the excavation length is likely to exceed the target excavation length L, the external processing device 30E may automatically close the bucket 6 and automatically raise the boom 4 so as to prevent the target excavation length L from being exceeded. Alternatively, when the excavation length is unlikely to reach the target excavation length L, the external processing device 30E may automatically lower the boom 4 so that the target excavation length L is reached. Furthermore, the external processing device 30E may adjust the closing speed of the arm 5.

Furthermore, the external processing device 30E may automatically raise or lower the boom 4 and may automatically open or close the bucket 6 so as to cause the excavation volume to be the target excavation volume Vt, while an arm closing operation is being performed during the excavation middle stage. Specifically, when the excavation volume is likely to exceed the target excavation volume Vt, the external processing device 30E may automatically close the bucket 6 and automatically raise the boom 4 so as to prevent the target excavation volume Vt from being exceeded. Alternatively, when the excavation volume is unlikely to reach the target excavation volume Vt, the external processing device 30E may automatically lower the boom 4 so that the target excavation volume Vt is reached. In this case, the external processing device 30E may derive the excavation volume based on the output of the image capturing unit D4, a distance measuring device, or the like. Furthermore, the external processing device 30E may achieve the target excavation volume Vt in preference to the target excavation length L. That is, the external processing device 30E may automatically raise the boom 4 when the excavation length is short of the target excavation length L, and may automatically lower the boom 4 when the excavation length is likely to exceed the target excavation length L. Furthermore, the external processing device 30E may adjust the closing speed of the arm 5.

Alternatively, the excavation assisting function may be a function to assist an excavating motion by causing the excavation attachment to operate fully automatically. Alternatively, the excavation assisting function may be a function to display information on the target excavation depth H and the target excavation length L on the image display device 40. In this case, the operator can perform efficient excavation by performing excavation while viewing the information displayed on the image display device 40.

As described above, the external processing device 30E derives the hardness K of the excavation target based on the insertion depth h of the teeth tips of the bucket 6 and the insertion resistance (excavation reaction force Fz) during the excavation initial stage, derives the target excavation depth H based on the hardness K, and derives the target excavation volume Vt commensurate with the allowable load weight of the bucket 6 based on the hardness K. The external processing device 30E can appropriately assist an excavation motion with the excavation attachment using the derived target excavation depth H. Therefore, the shovel 100 according to the embodiment of the present invention can achieve more efficient excavation. Specifically, it is possible to prevent the occurrence of a situation where excavation cannot be continued, being affected by the influence of an excavation load during excavation, or the excavation volume is reduced. As described above, the hardness K of the excavation target may be derived based on a value detected by a device attached to the shovel 100, such as the cylinder pressure detecting device D5, or may be derived based on a value detected by a device provided external to the shovel 100. Thus, according to this embodiment, the target excavation depth H from the latest excavation surface is set according to the hardness K. When a change in the hardness K is detected, the target excavation depth H is automatically corrected in accordance with the changed hardness K. In this manner, the controller 30 of the shovel 100 can perform control in such a manner as to prevent the teeth tips of the bucket 6, which are a working part, from exceeding the set target excavation depth H and target excavation length L.

Furthermore, the external processing device 30E derives the target excavation length L from the target excavation depth H and the target excavation volume Vt. The external processing device 30E can appropriately assist an excavating motion with the excavation attachment using the derived target excavation depth H and target excavation length L. Therefore, the shovel 100 according to the embodiment of the present invention can achieve more efficient excavation.

As an example of the excavation assisting function, the external processing device 30E may assist an excavating motion by causing the excavation attachment to operate semi-automatically. For example, the external processing device 30E may automatically control at least one of hydraulic actuators so as to prevent the weight of the excavation target in the bucket 6 from exceeding the allowable load weight.

The external processing device 30E may swing the teeth tips of the bucket 6 in response to determining that the excavation target is harder than a predetermined hardness. This is for performing an excavating motion more efficiently. For example, in response to determining that the hardness K of the excavation target is harder than a predetermined hardness during the excavation initial stage, the external processing device 30E may repeatedly open and close the bucket 6 slightly to swing the teeth tips of the bucket 6. Alternatively, the external processing device may swing the teeth tips of the bucket 6 by repeatedly performing at least one of slight vertical movements of the boom 4, slight opening and closing of the arm 5, and slight opening and closing of the bucket 6.

Furthermore, a shovel that excavates natural ground as an excavation target has been known. (See Japanese Unexamined Patent Publication No. 2002-30441.) The process of carrying out soil constituting natural ground, that is, soil excavated by the shovel, is generally planned based on the volume (total volume) of an excavation target area of the natural ground.

The unit volume weight (density) of soil constituting natural ground, however, varies depending on soil quality, etc. Furthermore, the density of soil not loosened before excavation differs from the density of loosened soil after excavation. Furthermore, the number of transporter vehicles is determined based on not the total volume but the total weight of soil to be carried out. This is because the maximum load capacity of a transporter vehicle means a maximum weight limit. Therefore, the process of carrying out soil cannot be accurately planned, nor can the number of transporter vehicles be accurately predicted, by calculating the total volume of natural ground alone.

In view of the above, a shovel (excavator) as a construction machine according to the embodiment of the present invention may also be configured to be able to more accurately derive the total weight of an excavation target.

Figure 10:
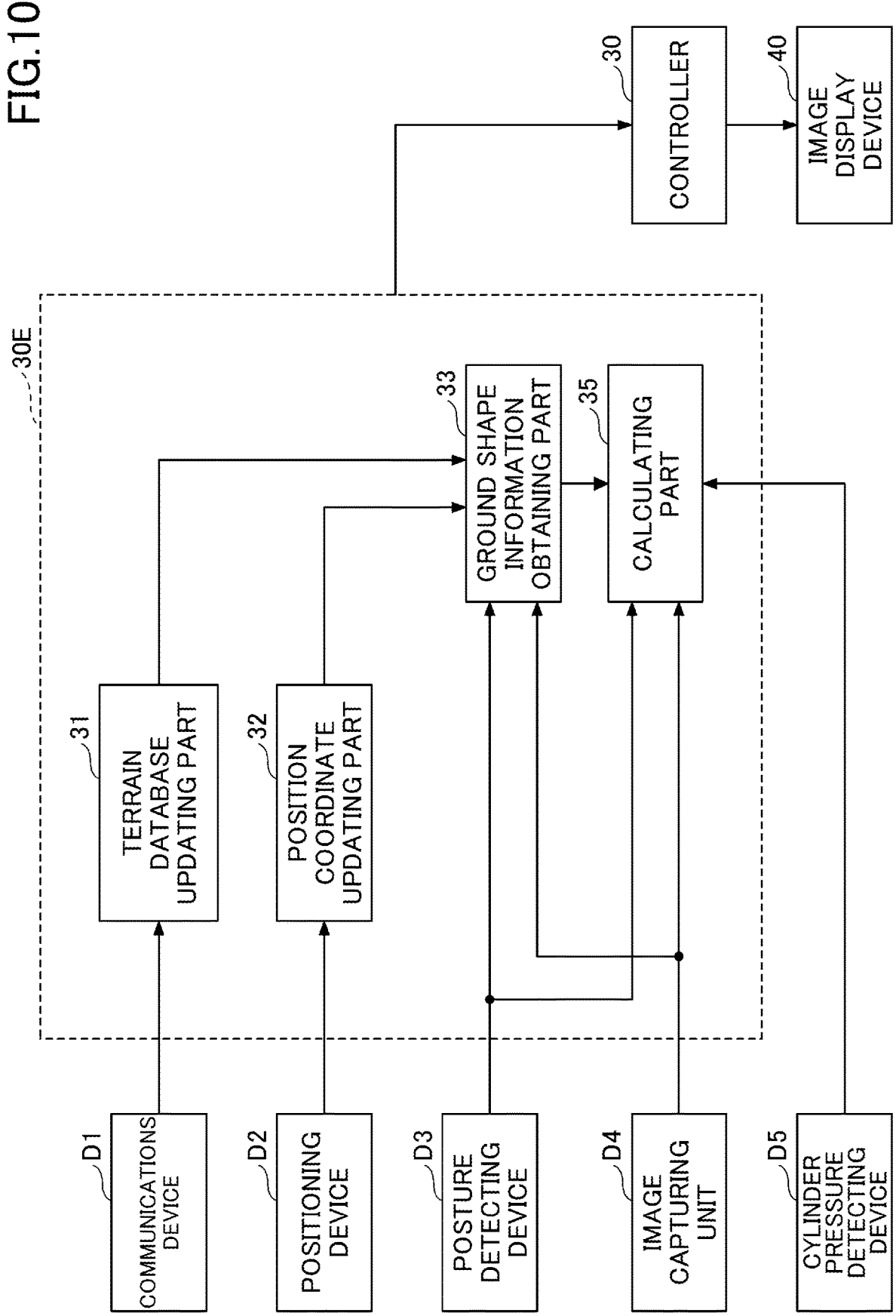
FIG. 10 is a functional block diagram illustrating an example configuration of the external processing device.

Here, functions of the external processing device 30E are described with reference to FIG. 10. FIG. 10 is a functional block diagram illustrating an example configuration of the external processing device 30E. According to this embodiment, the external processing device 30E receives the outputs of the communications device D1, the positioning device D2, the posture detecting device D3, the image capturing unit D4, the cylinder pressure detecting device D5, etc., to perform various operations, and outputs the operation results to the controller 30. For example, the controller 30 outputs a control command corresponding to the operation results to the image display device 40, etc.

Specifically, the external processing device 30E mainly includes the terrain database updating part 31, the position coordinate updating part 32, the ground shape information obtaining part 33, and a calculating part 35.

The terrain database updating part 31 is a functional element that updates the terrain database. The terrain database systematically stores the terrain information of a work site in a referable manner. According to this embodiment, the terrain database updating part 31 obtains the terrain information of a work site through the communications device D1 and updates the terrain database at the time of starting the shovel 100. The terrain database is stored in a nonvolatile memory such as an NVRAM. The terrain information of a work site is described in a three-dimensional terrain model based on the Global Positioning System.

The position coordinate updating part 32 is a functional element that updates the coordinates of the shovel 100 representing its current position and the orientation of the shovel 100. According to this embodiment, the position coordinate updating part 32 obtains the position coordinates and the orientation of the shovel 100 in the Global Positioning System based on the output of the positioning device D2, and updates data on the position coordinates of the shovel 100 representing its current position and the orientation of the shovel 100 stored in a nonvolatile memory.

The ground shape information obtaining part 33 is a functional element that obtains information on the current shape of the ground to be worked on. According to this embodiment, the ground shape information obtaining part 33 obtains information on the current shape of the excavation target object (for example, natural ground) based on the terrain information updated by the terrain database updating part 31, the position coordinates of the shovel 100 representing its current position and the orientation of the shovel 100 updated by the position coordinate updating part 32, and the historical transition of the posture of the excavation attachment detected by the posture detecting device D3.

The ground shape information obtaining part 33 derives the current shape of the excavation target object by removing a portion corresponding to the space passed through by the bucket 6 during the previous excavating motion from the shape of the excavation target object before performance of the previous excavating motion.

The ground shape information obtaining part 33 may obtain information on the current shape of the excavation target object based on an image of an area surrounding the shovel 100 captured by the image capturing unit D4. The ground shape information obtaining part 33 may obtain information on the current shape of the excavation target object based on the output of a distance measuring device such as a laser range finder, a laser scanner, a distance image sensor, or the like.

The ground shape information obtaining part 33 may transmit information on the current shape to a management apparatus installed in a management center, a mobile terminal (assist device), etc., through the communications device D1. The management apparatus, the assist device, etc., may update the terrain information of a work site in their possession based on information received through their attached receivers.

The calculating part 35 is a functional element that calculates information on the excavation target object. According to this embodiment, the calculating part calculates a total weight M1 from a total volume V1 and the unit volume weight (density ρ1) of the excavation target object before being excavated by the excavation attachment.

The total volume V1 of the excavation target object before being excavated by the excavation attachment is derived based on data on a current terrain and target terrain data. This is because the total volume V1 of the excavation target object before being excavated by the excavation attachment corresponds to, for example, a volume obtained by subtracting the total volume of a terrain constituent (for example, soil) constituting a target terrain from the total volume of a terrain constituent (for example, soil) constituting a current terrain.

The density ρ1 of the excavation target object before being excavated by the excavation attachment is derived from a weight M2 of an excavation target constituent (for example, soil) lifted by the excavation attachment. This is based on a first precondition that the weight M2 of the excavation target constituent lifted by the excavation attachment is equal to a weight M3 of the excavation target constituent that has occupied a space (hole) in the excavation target object created by excavation by the excavation attachment. This is also based on a second precondition that the density ρ1 of the excavation target object before being excavated by the excavation attachment is equal to a density ρ3 of the excavation target constituent that has occupied a space (hole) in the excavation target object created by excavation by the excavation attachment.

That is, letting the volume of the excavation target constituent that has occupied a space (hole) created by excavation by the excavation attachment be a volume V3, the first precondition is expressed by Eq. (1) and the second precondition is expressed by Eq. (2). The density ρ1 of the excavation target object before being excavated by the excavation attachment is expressed by Eq. (3), and the total weight M1 of the excavation target object before being excavated by the excavation attachment is expressed by Eq. (4). A volume V2 corresponds to the volume of the excavation target constituent lifted by the excavation attachment, and the volume V3 corresponds to the volume of the space (hole) created by excavation by the excavation attachment. In addition, a density ρ2 corresponds to the unit volume weight of the excavation target constituent lifted by the excavation attachment.

$$M2 = \rho2 \times V2 = M3 = \rho3 \times V3 \quad (1)$$

$$\rho1 = \rho3 \quad (2)$$

$$\rho1 = \frac{M2}{V3} \quad (3)$$

$$M1 = \rho1 \times V1 = \frac{M2}{V3} \times V1 \quad (4)$$

The density ρ1 of the excavation target object before being excavated by the excavation attachment is typically higher than the density ρ2 of the excavation target constituent lifted by the excavation attachment. This is because soil is loosened by excavation. This means that the volume V2 of the excavation target constituent lifted by the excavation attachment is larger than the volume V3 of the excavation target constituent that has occupied a space (hole) created by excavation by the excavation attachment.

Accordingly, the calculating part 35 can calculate the total weight M1 of the excavation target object before being excavated by the excavation attachment if the total volume V1 of the excavation target object (natural ground) before being excavated by the excavation attachment, the weight M2 of the excavation target constituent (soil) lifted by the excavation attachment, and the volume V3 of the space (hole) created by excavation by the excavation attachment can be derived. As described above, the total volume V1 is derived based on data on a current terrain and the target terrain data.

Therefore, based on the outputs of information obtaining devices, the calculating part 35 derives the weight M2 of the excavation target constituent lifted by the excavation attachment and the volume V3 of the space (hole) created by excavation by the excavation attachment.

According to this embodiment, the calculating part 35 derives the weight M2 of the excavation target constituent lifted by the excavation attachment from the posture of the excavation attachment and the boom bottom pressure. The posture of the excavation attachment is derived from, for example, the respective outputs of the boom angle sensor D3*a*, the arm angle sensor D3*b*, the bucket angle sensor D3*c*, and the body tilt sensor D3*d*. The boom bottom pressure is detected by, for example, the boom bottom pressure sensor D5*b*. The relationship between the posture of the excavation attachment, the boom bottom pressure, and the weight M2 is prestored in, for example, an NVRAM or the like.

The calculating part 35 may derive the weight M2 of the excavation target constituent lifted by the excavation attachment based on at least one of the boom rod pressure, the boom bottom pressure, the arm rod pressure, the arm bottom pressure, the bucket rod pressure, and the bucket bottom pressure and on the posture of the excavation attachment.

In addition, the calculating part 35 derives the volume V3 of the space (hole) created by excavation by the excavation attachment based on, for example, terrain data before excavation and terrain data after excavation. According to this embodiment, the calculating part 35 obtains the terrain data before excavation and the terrain data after excavation based on an image of the excavation target object before excavation and an image of the excavation target object after excavation captured by the image capturing unit D4.

Alternatively, the calculating part 35 may derive the volume V3 of the space (hole) created by excavation by the excavation attachment based on the terrain data before excavation and information on a space passed through by the bucket 6 during the subsequent excavating motion. The information on a space passed through by the bucket 6 is derived from, for example, the respective time series data of the boom angle sensor D3*a*, the arm angle sensor D3*b*, the bucket angle sensor D3*c*, and the body tilt sensor D3*d* after the start of the excavating motion.

In this manner, the calculating part 35 can calculate the total weight M1 of the excavation target object before being excavated by the excavation attachment.

The calculating part 35 may calculate the number of transporter vehicles to be assigned from the total weight M1 of the excavation target object. The number of transporter vehicles to be assigned is calculated by, for example, dividing the total weight M1 of the excavation target object by the maximum load capacity (maximum weight limit) of a transporter vehicle. Then, the calculating part 35 may cause information on the number of transporter vehicles to be assigned to be displayed on the image display device 40. According to this embodiment, the calculating part 35 outputs information on the number of transporter vehicles to be assigned to the controller 30. In response to receiving the information on the number of transporter vehicles to be assigned, the controller 30 outputs a control command to the image display device 40. The image display device 40 causes the information on the number of transporter vehicles to be assigned received by the controller 30 to be displayed on the image display part 41.

The calculating part 35 may calculate excavation efficiency based on the total volume V1 or the total weight M1 of the excavation target object and excavation energy required to excavate the excavation target object. Examples of the excavation energy required to excavate the excavation target object include the time, the amount of fuel consumption, etc., required to excavate the excavation target object. The excavation efficiency is calculated by, for example, dividing the total volume V1 or the total weight M1 of the excavation target object by the time required to excavate the excavation target object. In this case, the excavation efficiency is calculated as an excavation volume or an excavation weight per unit time. Alternatively, the excavation efficiency may be calculated by dividing the total volume V1 or the total weight M1 of the excavation target object by the amount of fuel consumption required to excavate the excavation target object. In this case, the excavation efficiency is calculated as an excavation volume or an excavation weight per unit amount of fuel consumption. Information on the excavation efficiency may be displayed on the image display device 40. According to this embodiment, the calculating part 35 outputs information on the excavation efficiency to the controller 30. In response to receiving the information on the excavation efficiency, the controller 30 outputs a control command to the image display device 40. The image display device 40 causes the information on the excavation efficiency received by the controller 30 to be displayed on the image display part 41.

Figure 11:
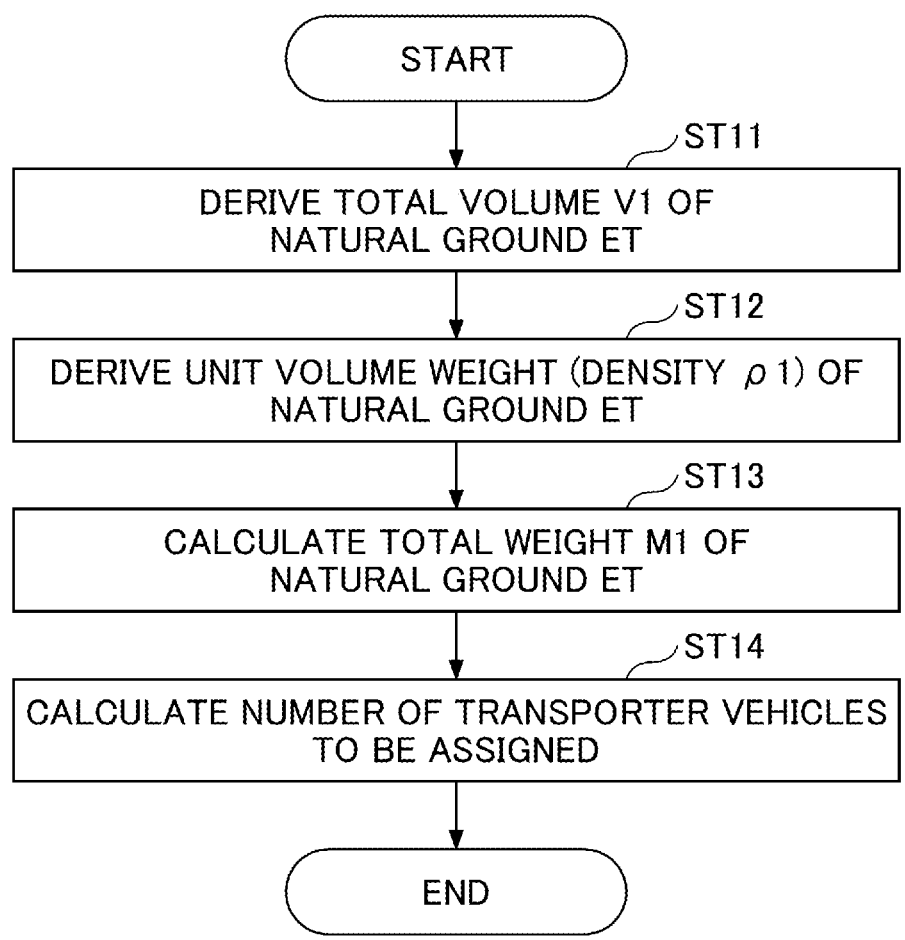
FIG. 11 is a flowchart of a vehicle assignment number calculating process.
Figure 12:
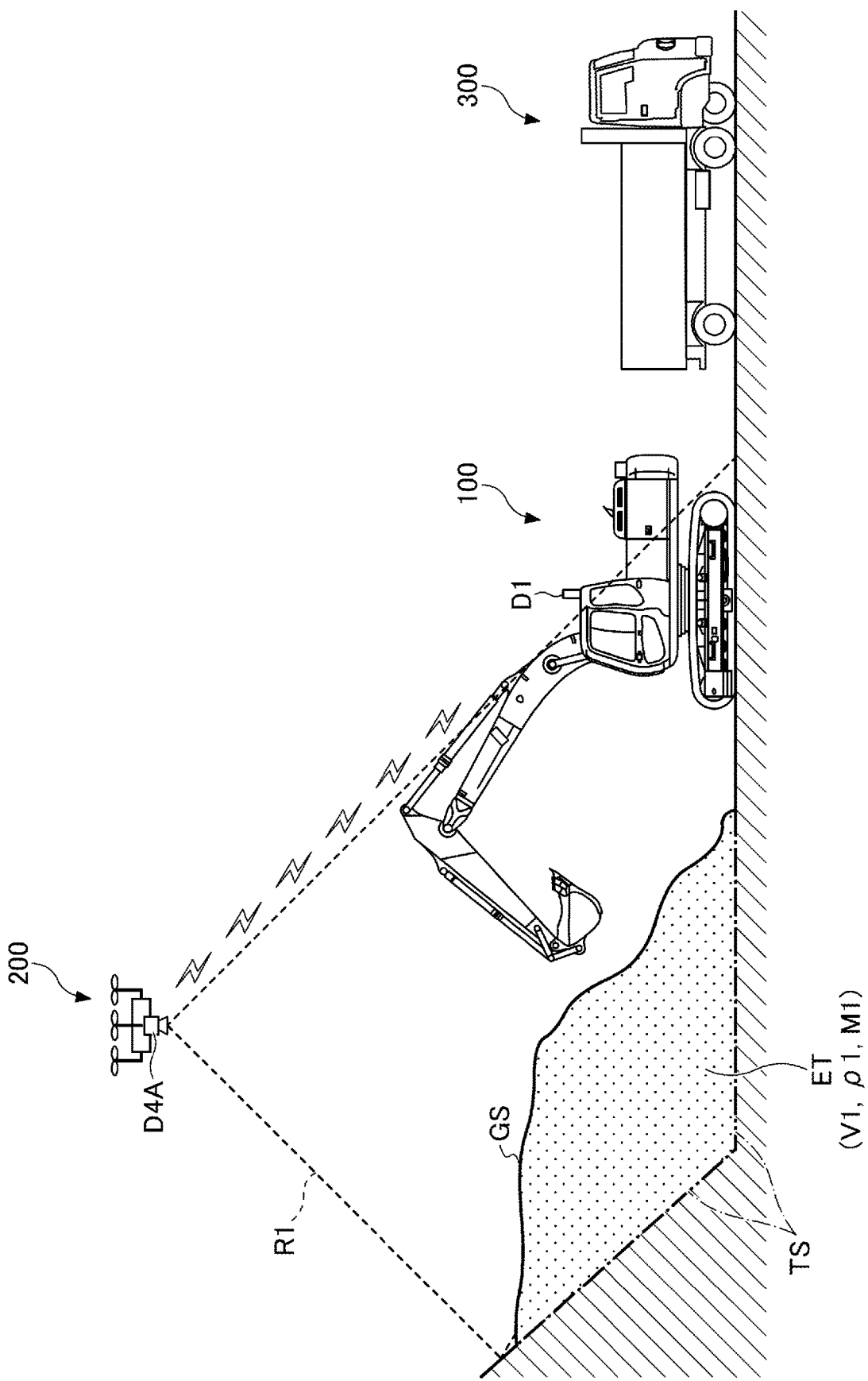
FIG. 12 is a diagram illustrating a method of deriving the total volume of natural ground before being excavated by an excavation attachment.
Figure 13:
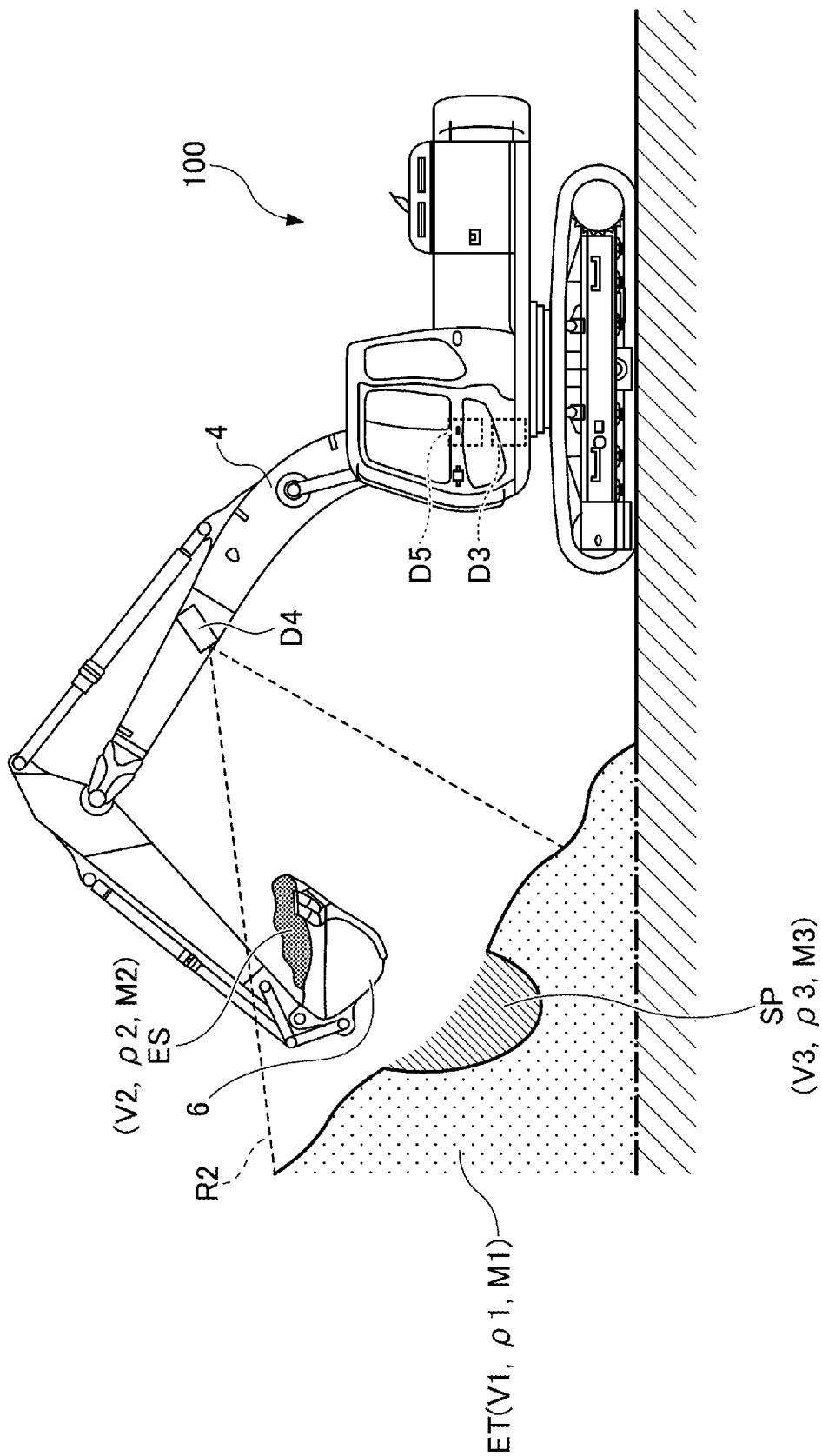
FIG. 13 is a diagram illustrating a method of deriving the unit volume weight (density) of the natural ground before being excavated by the excavation attachment.

Next, a process of calculating the number of transporter vehicles 300 to be assigned by the external processing device 30E installed in the shovel 100 (hereinafter, "vehicle assignment number calculating process") is described with reference to FIGS. 11 through 13. FIG. 11 is a flowchart of the vehicle assignment number calculating process. FIG. 12 is a diagram illustrating a method of deriving the total volume V1 of natural ground ET before being excavated by the excavation attachment. A coarse dot pattern area in FIG. 12 represents the natural ground ET (V1, ρ1, M1) as an excavation target object constituting a ground surface GS before being worked on, and the one-dot chain line represents the surface of a target terrain (target work surface TS) buried under the natural ground ET. V1, ρ1, and M1 represent the total volume, density, and total weight of the natural ground ET. FIG. 13 is a diagram illustrating a method of deriving the unit volume weight (density ρ1) of the natural ground ET before being excavated by the excavation attachment. A coarse dot pattern area in FIG. 13 represents the natural ground ET as an excavation target object, and the one-dot chain line represents the surface of the target terrain buried under the natural ground ET. Furthermore, a fine dot pattern area represents soil ES (V2, ρ2, M2) lifted by the bucket 6, and a fine oblique line pattern area represents a hole SP (V3, ρ3, M3) in the natural ground ET created by excavation by the excavation attachment. V2, ρ2, and M2 represent the volume, density, and weight of the soil ES. V3, ρ3, and M3 represent the volume, density, and weight of soil occupying the hole SP before excavation.

According to this embodiment, the external processing device 30E executes this vehicle assignment number calculating process while the shovel 100 is operating in a trial excavation mode. For example, the operator can switch the operating mode of the shovel 100 from a normal mode to the trial excavation mode by operating a mode switch included in a switch panel serving as the input part 42 of the image display device 40.

First, the calculating part 35 of the external processing device 30E derives the total volume V1 of the natural ground ET (step ST11). According to this example, as illustrated in FIG. 12, the calculating part 35 derives the total volume V1 of the natural ground ET based on an image captured by an image capturing unit D4A installed in an aerial vehicle 200, which is the captured image data of the natural ground ET (current ground surface) before excavation, and on the target terrain data. The total volume V1 of the natural ground ET may be derived based on the captured image data of the natural ground ET before excavation captured by the image capturing unit D4 attached to a side surface of the boom 4 and on the target terrain data.

The shovel 100 communicates with the aerial vehicle 200 through the communications device D1 to obtain an image transmitted by the aerial vehicle 200. An area R1 indicated by a dashed line represents the imaging area of the image capturing unit D4A.

The calculating part 35 can obtain information on the current terrain of an area surrounding the shovel 100 including the natural ground ET based on the image transmitted by the image capturing unit D4A serving as a stereo camera. Examples of the information on the current terrain include the total volume of soil constituting the current terrain. Then, a volume obtained by subtracting the total volume of soil constituting the target terrain from the total volume of soil constituting the current terrain is derived as the total volume V1 of the natural ground ET before being excavated by the excavation attachment. The total volume of soil constituting the target terrain is derived from the target terrain data. At least part of this processing may be executed by the aerial vehicle 200.

Thereafter, the calculating part 35 derives the unit volume weight (density ρ1) of the natural ground ET (step ST12). According to this example, as illustrated in FIG. 13, the calculating part 35 derives the density ρ1 based on the captured image data of the natural ground ET before and after excavation captured by the image capturing unit D4 attached to a side surface of the boom 4, the posture of the excavation attachment detected by the posture detecting device D3, and the boom bottom pressure detected by the cylinder pressure detecting device D5. An area R2 indicated by a dashed line in FIG. 13 represents the imaging area of the image capturing unit D4. The calculating part 35 may derive the density ρ1 based on the captured image data of the natural ground ET before and after excavation captured by the image capturing unit D4A, the posture of the excavation attachment detected by the posture detecting device D3, and the boom bottom pressure detected by the cylinder pressure detecting device D5. At least part of this processing may be performed by the aerial vehicle 200.

Specifically, the calculating part 35 derives the weight M2 of the soil ES lifted by the excavation attachment from the posture of the excavation attachment and the boom bottom pressure. In addition, the calculating part 35 derives the volume V3 of the hole SP created by excavation by the excavation attachment from the terrain data before excavation and the terrain data after excavation. The terrain data before excavation is derived from the captured image data of the natural ground ET before excavation captured by the image capturing unit D4. The same is true for the terrain data after excavation.

The calculating part 35 may derive the volume V2 of the soil ES based on an image of the soil ES lifted by the bucket 6, captured by the image capturing unit D4. In this case, the unit volume weight (density $\rho 2$) may be derived from the volume V2 and the weight M2. Then, the calculating part 35 may, based on an image of soil spilled from the bucket 6 captured by the image capturing unit D4, derive a volume V4 of the spilled soil (not depicted). In this case, a weight M4 of the spilled soil (not depicted) may be derived from the volume V4 and the density $\rho 2$. This is based on the precondition that a density $\rho 4$ of the spilled soil (not depicted) is equal to the density $\rho 2$ of the soil ES lifted by the bucket 6. The calculating part may then derive the density $\rho 1$ of the natural ground ET before being excavated by the excavation attachment from the sum of the weight M2 and the weight M4. This is based on the precondition that the sum of the weight M2 of the soil lifted by the bucket 6 and the weight M4 of the soil spilled from the bucket 6 is equal to the weight M3 of the soil that has occupied the hole SP in the natural ground ET created by excavation by the excavation attachment.

Thereafter, the calculating part 35 calculates the total weight M1 of the natural ground ET (step ST13).

According to this example, the calculating part 35 calculates the total weight M1 of the natural ground ET based on the total volume V1 of the natural ground ET derived at step ST11 and the unit volume weight (density $\rho 1$) of the natural ground ET derived at step ST12. The calculating part 35 calculates the total weight M1 of the natural ground ET based on, for example, Eqs. (1) through (4) described above.

Thereafter, the calculating part 35 calculates the number of transporter vehicles to be assigned (step ST14). According to this example, the calculating part 35 calculates the number of transporter vehicles required to carry out all soil constituting the natural ground ET based on the total weight M1 of the natural ground ET calculated at step ST13 and the maximum load capacity (maximum weight limit) of a transporter vehicle.

The calculating part 35 may transmit the total weight M1 of the natural ground ET calculated at step ST13 to a management apparatus installed in a management center, a mobile terminal (assist device), or the like via the communications device D1. In this case, the number of transporter vehicles may be calculated at the management apparatus, the assist device, or the like. At least one of the total volume V1, the unit volume weight (density $\rho 1$), and the total weight M1 of the natural ground ET may be derived or calculated at the management apparatus, the assist device, or the like.

According to this configuration, the external processing device 30E can more accurately derive the total weight M1 of the natural ground ET as an excavation target object. Furthermore, the external processing device 30E, the management apparatus, the assist device, etc., can more accurately derive the number of transporter vehicles to be assigned based on the total weight M1 of the natural ground ET.

Figure 14:
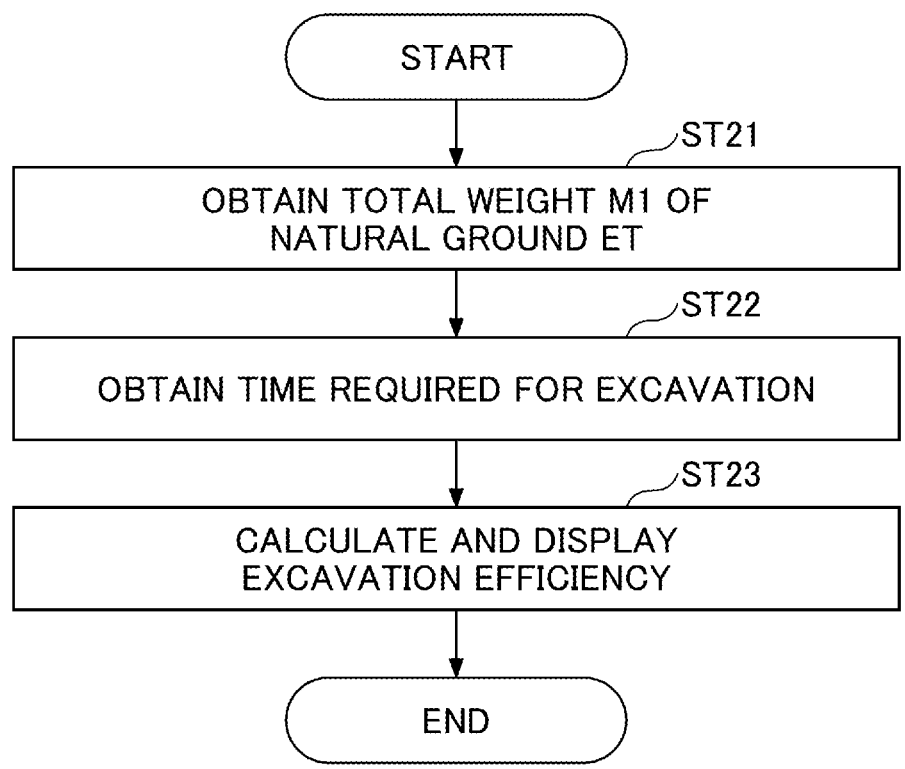
FIG. 14 is a flowchart of an excavation efficiency calculating process.

Next, a process of calculating the excavation efficiency of the shovel 100 by the external processing device 30E installed in the shovel 100 (hereinafter, "excavation efficiency calculating process") is described with reference to FIG. 14. FIG. 14 is a flowchart of the excavation efficiency calculating process. For example, the external processing device 30E executes this excavation efficiency calculating process when a predetermined switch included in a switch panel serving as the input part 42 of the image display device 40 is operated. The external processing device 30E may automatically execute this excavation efficiency calculating process when a predetermined condition is satisfied.

First, the external processing device 30E obtains the total weight M1 of the natural ground ET (step ST21). According to this embodiment, the external processing device 30E reads and obtains the total weight M1 of the natural ground ET calculated in the vehicle assignment number calculating process and stored in a predetermined storage area.

Thereafter, the external processing device 30E obtains the time required for excavation (step ST22). According to this embodiment, the external processing device 30E obtains the shovel operating time measured using a timer as the time required for excavation. The timer, for example, starts measuring time when the engine 11 is started and terminates measuring time when the engine 11 is stopped. The accumulated time of lever operations may be obtained as the time required for excavation.

Thereafter, the external processing device 30E calculates and displays the excavation efficiency (step ST23). According to this embodiment, the external processing device 30E calculates excavation weight per unit time as the excavation efficiency by dividing the total weight M1 of the natural ground ET obtained at step ST21 by the shovel operating time obtained at step ST22. The external processing device 30E then displays the calculated excavation efficiency on the image display device 40.

The external processing device 30E may transmit the total volume V1 of the natural ground ET and the shovel operating time to a management apparatus installed in a management center, a mobile terminal (assist device), or the like via the communications device D1. In this case, the excavation efficiency of the shovel 100 may be calculated at the management apparatus, the assist device, or the like.

The excavation efficiency may be the weight of soil excavated per unit time (for example, a day). In this case, the weight of the excavated soil may be the integral of the weight M2 of the soil lifted by the bucket 6. The excavation efficiency may be the volume of soil excavated per unit time. In this case, the volume of the excavated soil may be derived from an image captured by the image capturing unit D4, the image capturing unit D4A, or the like.

According to this configuration, the external processing device 30E, the management apparatus, the assist device, etc., can more accurately derive the excavation efficiency of the shovel 100. The external processing device 30E can then present the excavation efficiency of the shovel 100 to the operator, a manager, etc.

Figure 15:
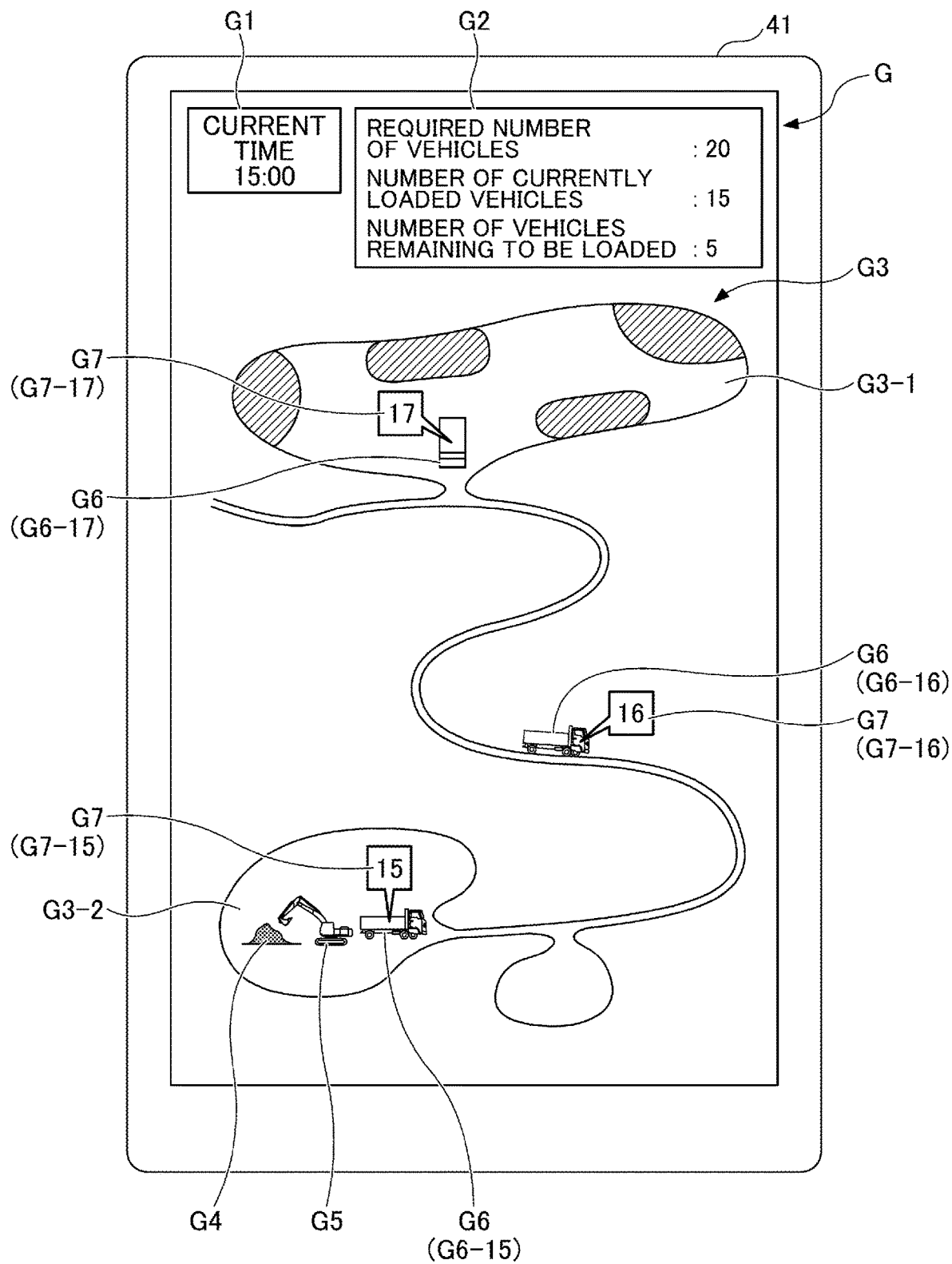
FIG. 15 is a diagram illustrating a screen displayed on an image display device.

Next, information on a transporter vehicle displayed on the image display device 40 is described with reference to FIG. 15. FIG. 15 illustrates an example screen G displayed on the image display part 41 of the image display device 40. The screen G may be displayed on a display device of a management apparatus installed in a management center, a mobile terminal (assist device), etc.

The screen G mainly includes a time displaying part G1, a vehicle number information displaying part G2, and a map information displaying part G3. The time displaying part G1 is an area for displaying time. According to this example, a current time of "15:00" is displayed.

The vehicle number information displaying part G2 is an area for displaying information on the number of transporter vehicles to be assigned. According to this example, it is shown that the required number of vehicles is "20," the number of currently loaded vehicles is "15," and the number of vehicles remaining to be loaded is "5." The required number of vehicles represents, for example, the number of transporter vehicles required to carry out all soil constituting the natural ground ET as an excavation target object. The number of currently loaded vehicles represents, for example, the number of transporter vehicles that have been loaded with soil. The number of vehicles remaining to be loaded represents, for example, the number of vehicles obtained by subtracting the number of currently loaded vehicles from the required number of vehicles. The information on the number of transporter vehicles to be assigned is calculated based mainly on the total weight M1 of the natural ground ET calculated by the external processing device 30E and the maximum load capacity (maximum weight limit) of a transporter vehicle.

The map information displaying part G3 is an area for displaying a map image. According to this example, a map image of a region including a work site and a soil dump site is displayed. Therefore, the map information displaying part G3 includes an image G3-1 representing the soil dump site and an image G3-2 representing the work site. Furthermore, the map information displaying part G3 includes a natural ground image G4 representing the natural ground ET, a shovel image G5 representing the shovel 100, vehicle images G6 representing transporter vehicles, and number images G7 representing the numbers of transporter vehicles. The map information displaying part G3 may include an image relating to the density $\rho 2$ of the excavation target constituent as derived. In this case, information on the density $\rho 2$ may be superimposed and displayed over the terrain information. Furthermore, the map information displaying part G3 may include an image relating to the hardness K of the excavation target as derived. In this case, information on the hardness K may be superimposed and displayed over the terrain information. The natural ground image G4 is, for example, a natural ground icon representing the natural ground ET. The shape (size) of the natural ground icon may be so changed as to be reduced as the weight of already carried out soil increases, for example.

The shovel image G5 is, for example, a shovel icon representing the shovel 100.

The vehicle images G6 representing transporter vehicles are, for example, vehicle icons representing transporter vehicles. The display positions of the vehicle icons are based on position information transmitted by each transporter vehicle. A vehicle image G6-15 in FIG. 13 represents the position of the fifteenth transporter vehicle, a vehicle image G6-16 represents the position of the sixteenth transporter vehicle, and a vehicle image G6-17 represents the position of the seventeenth transporter vehicle. The external processing device 30E determines the displayed positions of the vehicle icons based on the position information received from each transporter vehicle via the communications device D1, for example. The external processing device 30E may obtain the position information of each transporter vehicle through a management apparatus installed in a management center, a mobile terminal (assist device), or the like.

The number images G7 representing the numbers of transporter vehicles are, for example, balloon images representing the loading order of transporter vehicles. The loading order is based on information transmitted by each transporter vehicle. In FIG. 13, a number image G7-15 represents the 15th spot in the loading order, a number image G7-16 represents the 16th spot in the loading order, and a number image G7-17 represents the 17th spot in the loading order. The external processing device 30E displays the loading order of transporter vehicles based on the order information received from each transporter vehicle via the communications device D1, for example. The external processing device 30E may assign transporter vehicles heading toward the work site respective spots in their loading order in order of proximity to the work site. A transporter vehicle may keep its spot in the loading order after completion of the loading of soil until dumping the soil in the soil dump site, and be assigned a new spot in the loading order after completion of the dumping of the soil.

The external processing device 30E may be configured to receive and display images generated by a management apparatus, an assist device, etc. In this case, the screen G displayed on the image display part 41 of the image display device 40 is an image generated by the management apparatus, the assist device, or the like. Therefore, the display positions, the loading order, etc., of transporter vehicles are determined at the management apparatus, the assist device, etc.

According to this configuration, the external processing device 30E can inform the operator of information on transporter vehicles in an easily understandable manner by causing the information on transporter vehicles to be displayed on the image display device 40. The operator of the shovel 100 can easily understand the approximate time of arrival of the next transporter vehicle at the work site by viewing the screen G, for example.

An embodiment of the present invention is described above. The present invention, however, is not limited to the above-described embodiment. Various modifications, substitutions, etc., may apply to the above-described embodiment without departing from the scope of the present invention. Furthermore, the technical features described with reference to the above-described embodiment may be suitably combined as long as causing no technical contradiction.

For example, while described as a separate processing device external to the controller 30 according to the above-described embodiment, the external processing device 30E may be integrated into the controller 30. Furthermore, instead of the controller 30, the external processing device 30E may directly control the image display device 40. Furthermore, instead of the controller the external processing device 30E may directly control the motion controlling part E1.

While selecting the trial excavation mode and executing the vehicle assignment number calculating processing before starting excavation work according to the above-described embodiment, the operator of the shovel 100 may select the trial excavation mode and execute the vehicle assignment number calculating processing during excavation work. In this case, the operator can correct the number of transporter vehicles to be assigned during excavation work.

Furthermore, according to the above-described embodiment, the external processing device 30E calculates excavation efficiency based on the total volume V1 or the total weight M1 of the natural ground ET and the excavation energy required to excavate the natural ground ET after performance of excavation work. The present invention, however, is not limited to this configuration. For example, the external processing device 30E may estimate the shovel operating time, the amount of fuel consumption, etc., required to excavate the natural ground ET, based on the total volume V1 or the total weight M1 of the natural ground ET, information on the past excavation efficiency, etc., before performance of excavation work.

Figure 16:
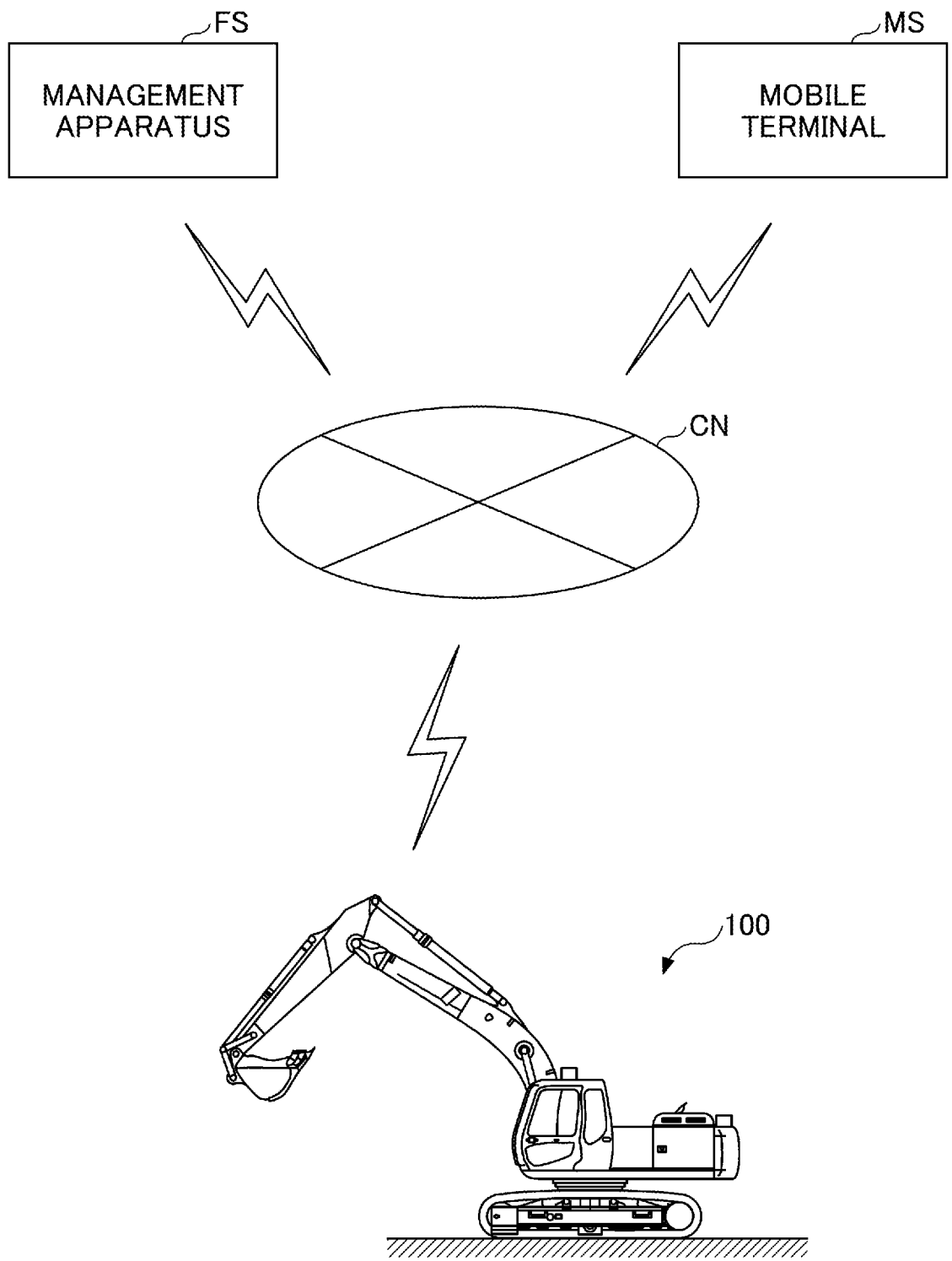
FIG. 16 is a diagram illustrating an example of a management and assist system for managing and assisting the shovel.

Work by the shovel 100 may be managed through an external management apparatus or may be assisted through an external mobile terminal (assist device). Here, a management and assist system for managing and/or assisting the shovel 100 is described with reference to FIG. 16. FIG. 16 is a schematic diagram illustrating an example of the management and assist system. As illustrated in FIG. 16, the management and assist system includes the shovel 100, a management apparatus FS, and a mobile terminal MS (assist device). The shovel 100, the management apparatus FS, and the mobile terminal MS operate as communication terminals interconnected through a communications network CN. Each of the shovel 100, the management apparatus FS, and the mobile terminal MS that constitute the shovel management and assist system may be one or more in number. In the illustration of FIG. 16, the management and assist system includes the single shovel 100, the single management apparatus FS, and the single mobile terminal MS.

The shovel 100 includes the communications device D1. The communications device D1 transmits information to the outside of the shovel 100. For example, the communications device D1 transmits information that can be received by at least one of the management apparatus FS and the mobile terminal MS.

The management apparatus FS is an apparatus managing the work of the shovel 100, and is, for example, a computer with a display device installed in a management center or the like outside a work site. The management apparatus FS may be a portable computer that can be carried by a user. The mobile terminal MS is a communication terminal with a display device, and includes a smartphone, a tablet terminal, a notebook personal computer, etc.

For example, when the total weight of an excavation target object is calculated in the shovel 100, the communications device D1 transmits information to the management apparatus FS and the mobile terminal MS via the communications network CN. This information includes information necessary to calculate the number of transporter vehicles to be assigned. The management apparatus FS and the mobile terminal MS calculate the number of transporter vehicles to be assigned, and display information on the number of transporter vehicles to be assigned on their respective attached display devices. As a result, a manager or the like of the shovel 100 can confirm the number of transporter vehicles to be assigned, using at least one of the management apparatus FS and the mobile terminal MS.

Alternatively, the shovel 100 or the management apparatus FS may calculate the number of transporter vehicles to be assigned, transmit data on the calculated number of vehicles to be assigned to the mobile terminal MS, and cause information on the number of vehicles to be assigned to be displayed on the display device of the mobile terminal MS.

Various aspects of the subject-matter described herein may be set out non-exhaustively in the following numbered clauses:

1. A management apparatus for a shovel, including:
   a control device configured to calculate a number of transporter vehicles to be assigned from a weight of an excavation target; and
   a display device configured to display information on the calculated number of transporter vehicles to be assigned.
2. The management apparatus for the shovel of clause 1, further including:
   a receiver configured to receive information from the shovel, the shovel including a lower traveling body, an upper turning body mounted on the lower traveling body, and an attachment attached to the upper turning body,
   wherein the control device is configured to derive a volume of the excavation target before being excavated by the attachment and derive a unit volume weight of the excavation target before being excavated by the attachment based on the information received by the receiver, and calculate the weight of the excavation target from the volume and the unit volume weight of the excavation target before being excavated by the attachment.
3. An assist device for a shovel, including:
   a control device configured to calculate a number of transporter vehicles to be assigned from a weight of an excavation target; and
   a display device configured to display information on the calculated number of transporter vehicles to be assigned.
4. The assist device for the shovel of clause 3, further including:
   a receiver configured to receive information from the shovel, the shovel including a lower traveling body, an upper turning body mounted on the lower traveling body, and an attachment attached to the upper turning body,
   wherein the control device is configured to derive a volume of the excavation target before being excavated by the attachment and derive a unit volume weight of the excavation target before being excavated by the attachment based on the information received by the receiver, and calculate the weight of the excavation target from the volume and the unit volume weight of the excavation target before being excavated by the attachment.

What is claimed is:

1. A management apparatus for managing work of a shovel, the shovel including a lower traveling body, an upper turning body mounted on the lower traveling body, and an attachment attached to the upper turning body, the management apparatus comprising:
   a hardware processor configured to calculate a weight of an excavation target to be excavated by the shovel, from a volume and a weight per unit volume of the excavation target before being excavated by the attachment, and calculate a number of transporter vehicles to be assigned a for carrying out the excavation target of the calculated weight, based on the calculated weight of the excavation target; and
   a display device configured to display information on the calculated number of the transporter vehicles to be assigned.

2. The management apparatus as claimed in claim 1, further comprising:
   a receiver configured to receive information from the shovel,
   wherein the hardware processor is configured to derive the volume and the weight per unit volume of the excavation target before being excavated by the attachment based on the information received by the receiver.

3. The management apparatus as claimed in claim 1, wherein the display device is configured to display a number of transporter vehicles required to carry out the excavation target of the calculated weight, a number of transporter vehicles that are currently loaded, and a number of transporter vehicles remaining to be loaded as the information on the calculated number of the transporter vehicles to be assigned.

4. An assist device for a shovel, the shovel including a lower traveling body, an upper turning body mounted on the lower traveling body, and an attachment attached to the upper turning body, the assist device comprising:
- a hardware processor configured to calculate a weight of an excavation target to be excavated by the shovel, from a volume and a weight per unit volume of the excavation target before being excavated by the attachment, and calculate a number of transporter vehicles to be assigned for carrying out the excavation target of the calculated weight, based on the calculated weight of the excavation target; and
- a display device configured to display information on the calculated number of transporter vehicles to be assigned.

5. The assist device as claimed in claim 4, further comprising:
- a receiver configured to receive information from the shovel,
- wherein the hardware processor is configured to derive the volume and the weight per unit volume of the excavation target before being excavated by the attachment based on the information received by the receiver.

6. The assist device as claimed in claim 4, wherein the display device is configured to display a number of transporter vehicles required to carry out the excavation target of the calculated weight, a number of transporter vehicles that are currently loaded, and a number of transporter vehicles remaining to be loaded as the information on the calculated number of the transporter vehicles to be assigned.

* * * * *